US006756753B1

United States Patent
Marcinkiewicz

(10) Patent No.: US 6,756,753 B1
(45) Date of Patent: Jun. 29, 2004

(54) SENSORLESS CONTROL SYSTEM AND METHOD FOR A PERMANENT MAGNET ROTATING MACHINE

(75) Inventor: Joseph G. Marcinkiewicz, St. Charles, MO (US)

(73) Assignee: Emerson Electric Co., St. Louis, MO (US)

( * ) Notice: Subject to any disclaimer, the term of this patent is extended or adjusted under 35 U.S.C. 154(b) by 21 days.

(21) Appl. No.: 10/316,333

(22) Filed: Dec. 11, 2002

(51) Int. Cl.[7] .............................................. H02P 6/18
(52) U.S. Cl. ........................ 318/254; 318/138; 318/439; 318/700; 318/721; 318/724; 318/650
(58) Field of Search ............................... 318/254, 138, 318/439, 700, 721, 724, 650

(56) References Cited

U.S. PATENT DOCUMENTS

| 5,017,845 | A | 5/1991 | Carobolante et al. | 318/138 |
|---|---|---|---|---|
| 5,028,852 | A | 7/1991 | Dunfield | 318/254 |
| 5,072,166 | A | 12/1991 | Ehsani | 318/696 |
| 5,256,923 | A | 10/1993 | Bartos et al. | 310/166 |
| 5,291,115 | A | 3/1994 | Ehsani | 318/701 |
| 5,397,972 | A | 3/1995 | Maiocchi | 318/439 |
| 5,410,235 | A | 4/1995 | Ehsani | 318/701 |
| 5,448,149 | A | 9/1995 | Ehsani | 318/701 |
| 5,467,025 | A | 11/1995 | Ray | 324/772 |
| 5,525,887 | A | 6/1996 | Van Sistine | 318/701 |
| 5,537,019 | A | 7/1996 | Van Sistine et al. | 318/701 |
| 5,569,990 | A | 10/1996 | Dunfield | 318/254 |
| 5,569,994 | A | 10/1996 | Taylor et al. | 318/700 |
| 5,731,670 | A | 3/1998 | Galbiati et al. | 318/254 |
| 5,793,179 | A | 8/1998 | Watkins | 318/701 |
| 5,841,252 | A | 11/1998 | Dunfield | 318/254 |
| 5,883,485 | A | 3/1999 | Mehlhorn | 318/701 |
| 5,982,117 | A | 11/1999 | Taylor et al. | 318/254 |
| 5,998,946 | A | 12/1999 | Kim | 318/254 |
| 6,002,234 | A | 12/1999 | Ohm et al. | 318/729 |
| 6,005,364 | A | * 12/1999 | Acarnley | 318/632 |
| 6,023,141 | A | 2/2000 | Chalupa | 318/439 |
| 6,081,093 | A | * 6/2000 | Oguro et al. | 318/807 |
| 6,153,956 | A | 11/2000 | Branecky | 310/68 |
| 6,157,150 | A | 12/2000 | Konecny | 318/254 |
| 6,172,498 | B1 | 1/2001 | Schmidt et al. | 324/207.12 |
| 6,246,193 | B1 | 6/2001 | Dister | 318/254 |
| 6,288,513 | B1 | 9/2001 | Green | 318/700 |
| 6,291,949 | B1 | 9/2001 | Green | 318/254 |
| 6,304,014 | B1 | 10/2001 | England et al. | 310/68 |
| 6,326,750 | B1 | * 12/2001 | Marcinkiewicz | 318/432 |
| 6,351,094 | B1 | 2/2002 | Green | 318/701 |
| 6,462,491 | B1 | * 10/2002 | Iijima et al. | 318/254 |
| 6,661,194 | B2 | * 12/2003 | Zaremba et al. | 318/727 |
| 2002/0163319 | A1 | * 11/2002 | Kaneko et al. | 318/727 |

* cited by examiner

Primary Examiner—Rita Leykin
(74) Attorney, Agent, or Firm—Howrey Simon Arnold & White LLP

(57) ABSTRACT

A permanent magnet rotating machine control system and method includes an estimator that calculates an estimate of the machine's rotor speed. The estimator receives energization feed back from the machine in a first rotating reference frame and outputs the rotor speed estimate in a second rotating reference frame. A controller receives a rotor speed demand and the rotor speed estimate, and outputs control signals for controlling energization of the machine in response to the rotor speed demand and rotor speed estimate signals. The first rotating reference frame rotates at the commanded rotor speed, and the second rotating reference frame rotates at the estimated actual rotor speed.

25 Claims, 4 Drawing Sheets

SENSORLESS CONTROL SYSTEM AND METHOD FOR A PERMANENT MAGNET ROTATING MACHINE

BACKGROUND OF THE INVENTION

1. Field of the Invention

The invention relates generally to control of a rotating machine, and more particularly, to sensorless control of a permanent magnet rotating machine.

2. Description of Related Art

Permanent magnet machines, such as brushless permanent magnet motors, are well known. For example, a permanent magnet motor typically includes a stator with phase windings therein and a rotor with permanent magnets arranged to rotate relative to the stator. Position sensing devices are provided to indicate the rotor position with respect to the stator. The phase winding energization is generally controlled by solid state switches that are responsive to the rotor position indications provided by the position sensor to energize the windings in the proper commutated sequence. The phase windings may be energized by sine wave excitation or by angle controlled square wave excitation, for example.

The phase winding excitation depends on a scheme for synchronizing electromagnetic fields with the rotor permanent magnets. This includes tracking the angular position of the rotor, which carries the permanent magnets, via the position sensors. The rotor position sensors, however, can be quite expensive. Depending on the level of motor control required to perform a particular function, this cost can represent an appreciable portion of the motor's cost. In addition, sensors take up space within a motor housing as does their associated wiring. Still further, sensors can fail, resulting in a significant degradation of the motor's performance or even causing the motor to become inoperative.

To eliminate the need for position sensors, various "sensorless" motor constructions have been proposed. Unfortunately, the known sensorless schemes for PM motors have been largely unsatisfactory. For example prior art sensorless PM machines tend to be susceptible to noise problems, and performance tends to vary with rotor speed. Moreover, typical known sensorless PM machines only function for sine wave or 120 degree square wave excitation of the machine.

Thus, a need exists for a high performance sensorless control system for rotating PM machines that addresses the shortcomings of the prior art.

SUMMARY OF THE INVENTION

In one aspect of the present invention, a permanent magnet rotating machine, such as a permanent magnet AC motor, and a control system for such a machine includes an estimator that calculates an estimate of the machine's rotor speed. The estimator receives energization feed back from the machine in a first rotating reference frame and outputs the rotor speed estimate in a second rotating reference frame. A controller receives a rotor speed demand and the rotor speed estimate, and outputs control signals for controlling energization of the machine in response to the rotor speed demand and rotor speed estimate signals.

In other aspects of the invention, a method of controlling a permanent magnet rotating machine includes receiving a rotor speed demand and generating a rotor speed command in response to the speed demand. A first rotating reference frame rotating at the commanded rotor speed is generated, and phase winding energization feed back is transformed from a stationary reference frame to the first rotating reference frame. The actual speed of the machine's rotor is estimated, and a second rotating reference frame rotating at the estimated actual rotor speed is generated. The energization feed back is transformed from the first rotating reference frame to the second rotating reference frame, and phase energization commands are calculated. The phase energization commands are transferred from the second rotating reference frame to the stationary reference frame for application to the machine phase windings.

The use of the two rotating reference frames improves performance of the control system across the machine's speed range. In exemplary implementations, a rotor position command is calculated based on the rotor speed command and the first rotating reference frame is generated based thereon. The actual rotor position may be estimated based on estimates of the magnet induced flux linkage.

BRIEF DESCRIPTION OF THE DRAWINGS

Other objects and advantages of the invention will become apparent upon reading the following detailed description and upon reference to the drawings in which.

Figure 1:
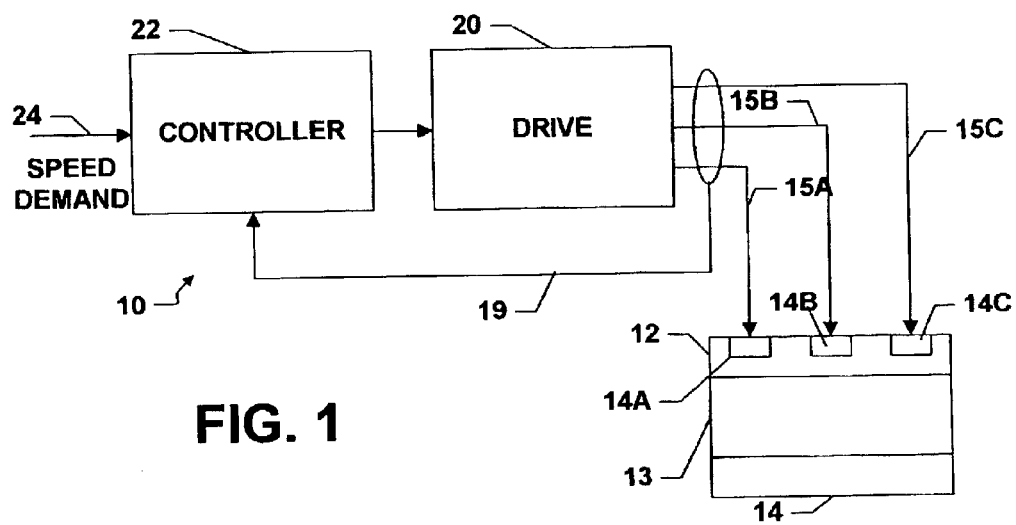
FIG. 1 is a block diagram illustrating a rotating permanent magnet machine system in accordance with an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 illustrates a rotating permanent magnet machine system 10 in accordance with aspects of the present invention. The machine system 10 includes a rotating permanent magnet electric machine, such as a permanent magnet AC ("PMAC") motor 12. For simplicity, the term "motors" is often used in this specification. However, one skilled in the art having the benefit of this disclosure will understand that the present invention is applicable to other types of rotating electric machines, including motors and generators. The PM motor 12 is of conventional construction that includes a rotating component (a rotor 13) and a stationary component (a stator 14). In the exemplary embodiment illustrated, the PM motor 12 is a three phase machine, accordingly, wound about the stator 14 are energizable phase windings 14A, 14B,14C corresponding to the A, B and C machine phases. The phase windings 14A,14B,14C may be energized through the application of electric power to motor terminals 15A,15B,15C.

A drive 20 is coupled to provide electric power to the terminals 15A,15B,15C of the machine 12. The drive 20 receives control inputs from a controller 22, which is coupled to receive feedback from the machine 12 in terms of energization feedback 19 such as the currents and/or voltages at the terminals 15A,15B,15C. While the drive 14 is illustrated in exemplary form as providing three power terminals to the three phase machine 12, it should be understood that more or fewer power terminals may be provided to accommodate machines with greater than three phases, less than three phases or if various types of inverters (e.g., with neutral connections) are used. The drive 20 may be of conventional design and configured to provide sine wave excitation to the windings 14A,14B,14C, or square wave excitation may be used via six-step commutation.

The controller 22 also receives input command signals that correspond to a desired output parameter of machine 12 such as rotor speed, output torque, etc. In the illustrated embodiment, the controller 22 receives a speed demand signal 24 that represents the desired rotational velocity of the rotor 13. As described in more detail below, the drive 20 controls the application of electric power to the PM machine 12 in response to the controller 22 to achieve the demanded speed—the controller operates to minimize the difference between the desired speed and the actual speed.

The PM machine system 12 is a "sensorless" system, in that direct rotor position sensing devices are not used. Rather, the rotor position and speed are determined based on the energization feedback 19, eliminating the cost and complexity added by separate position sensors.

Figure 2:
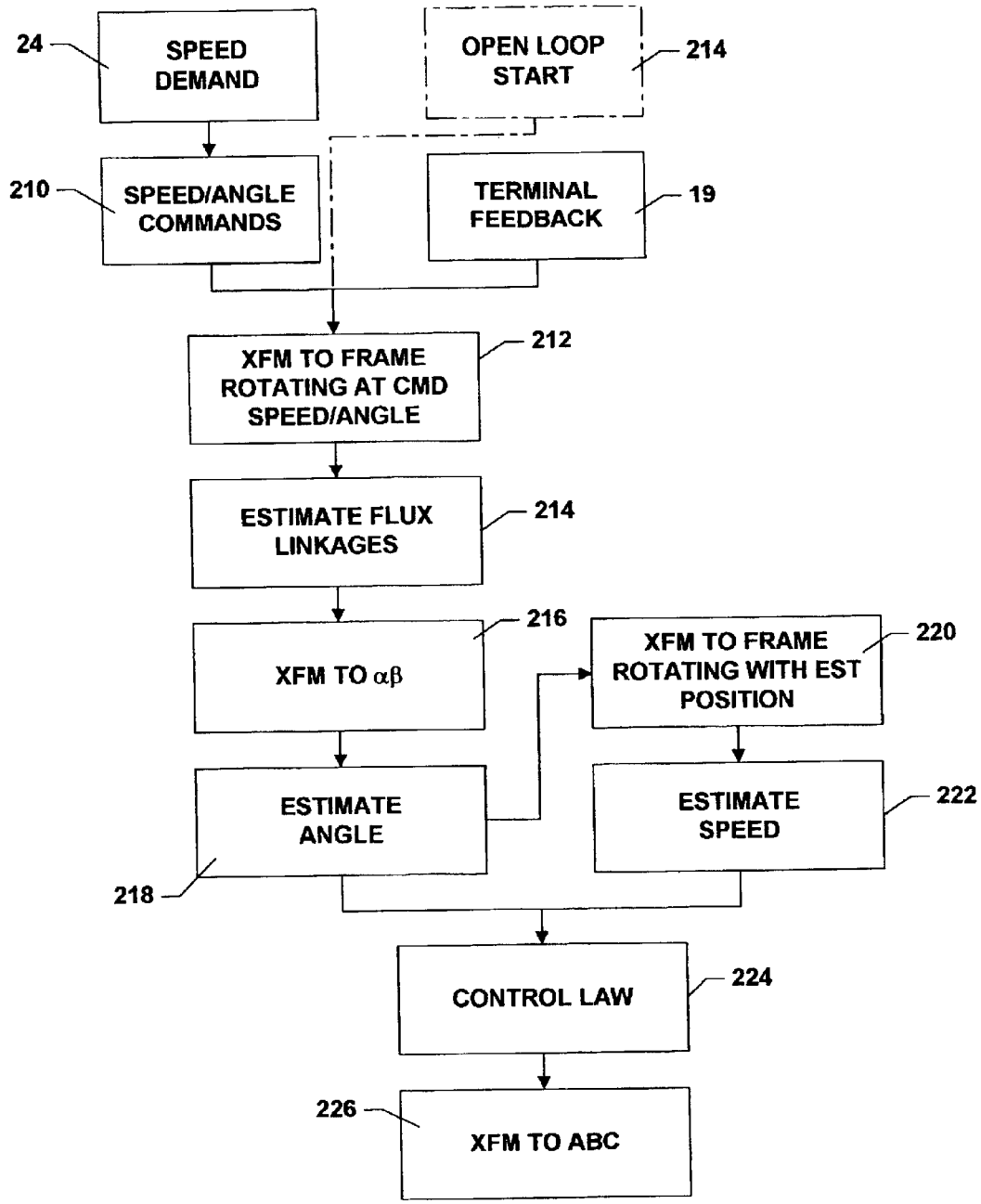
FIG. 2 is a flow diagram illustrating a method for controlling a permanent magnet machine in accordance with embodiments of the present invention.

FIG. 2 generally shows a control method for the system 10 in accordance with exemplary embodiments of the present invention. The various transforms and control schemes described herein may be implemented, for example, by an appropriately programmed digital controller, such as a digital signal processor (DSP), microcontroller or microprocessor. As noted above, the controller 22 receives the speed demand signal 24 that represents the desired rotational speed of the rotor 13. In general, the speed demand is compared to the actual rotor speed to calculate a speed error, and control laws are applied to the error signal to adjust the application of power to the motor terminals 15A,15B,15C, thus minimizing the speed error. Since rotor position sensors are not used in the illustrated system 10, information available from the motor terminals 15A,15B, 15C is used to estimate the rotor position and speed, and this estimate is compared to the speed demand signal 24 to calculate the speed error.

Referring to FIG. 2, the speed demand signal 24 is received by the system, and based thereon, speed and angle commands are generated in block 210. The speed and angle command signals, together with the energization feedback 19 (for example, phase current and/or voltage), are used to generate a first rotating reference frame in block 212, and the energization feedback 19 is transformed from the stationary stator reference frame into the first rotating reference frame.

At start-up (zero speed), the terminal feedback information 19 is not useful. Thus, the system starts open loop, and block 212 uses open loop start information (block 214 ) to generate the rotating reference frame and subsequent command signals. Further, since the motor 12 does not include rotor position sensors, the first rotating reference frame is initially based on the commanded speed and angle, since information to estimate the actual rotor speed is not useful at zero speed.

The terminal feedback 19, transformed into the first reference frame rotating at the commanded speed, is used to estimate the actual rotor angle in block 218. In the illustrated exemplary method, the total flux and the magnet flux linkages are estimated in the first reference frame in block 214. The flux linkage estimates are transformed into the stator $\alpha\beta$ frame of reference in block 216 and used to estimate the rotor angle in block 218. Based on the estimate of the actual rotor angle in block 218, a second rotating reference frame is generated, rotating in synchronism with the estimated rotor angle in block 220, and in block 222, the actual rotor speed is estimated in the second rotating reference frame.

The estimated rotor angle and speed information (blocks 218, 222) is fed back to the controller 22 to be applied to various control laws in block 224, together with the angle and speed command signals, to generate the proper voltages to be applied to the machine terminals 15A,15B,15C. In block 226, the voltage information is transformed back to the stationary reference frame so that the drive 20 can apply the proper voltages to the machine terminals 15A,15B,15C.

Figure 3:
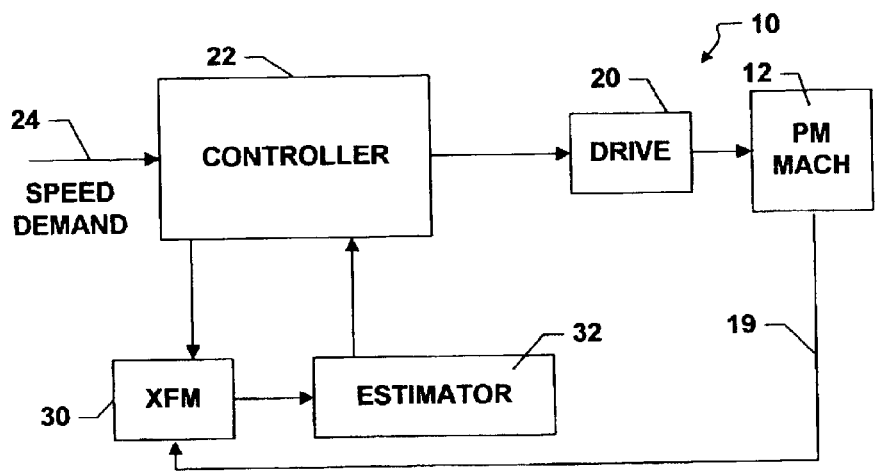
FIG. 3 is a block diagram conceptually illustrating further aspects of the permanent magnet machine system shown in FIG. 1.

FIG. 3 conceptually illustrates further aspects of the PM machine system 10 in accordance with certain embodiments of the present invention. It is common in many applications to utilize what is known as a balanced three phase feed for energizing the motor's phase windings. In such systems, when a three-phase motor is used, the sum of the three phase currents will equal zero. Hence, the $\alpha\beta$0-Frame of Reference ("FoR") can be used. The following disclosure assumes a PMAC motor using a balanced three phase feed.

Based on the speed demand signal 24, the angle and speed command signals for the A, B and C motor phases are output to a transformation block 30 that creates a first, or "command," reference frame rotating in synchronism with the commanded motor speed and commanded rotor position. In other words, the command reference frame rotates at the commanded speed. The command reference frame is also referred to herein as the "QDv" frame of reference ("QDv-FoR"). The motor terminal feedback 19 is also received by the transformation block 30, which transforms the phase currents and phase voltages into the command reference frame.

Figure 4:
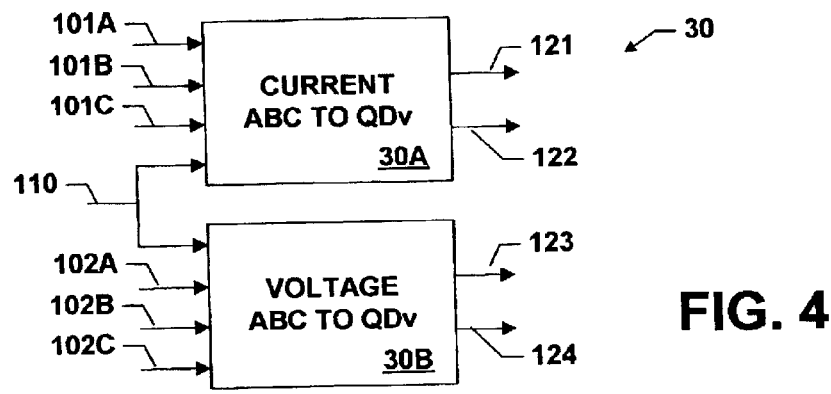
FIG. 4 conceptually illustrates function blocks for transforming signals from a stationary reference frame to a rotating reference frame.

FIG. 4 generally illustrates the transformation block 32 in further detail. As noted above, the current and voltage signals are transformed from the stationary ABC reference frame ("ABC-FoR") to the command reference frame, which rotates at the to commanded speed with the commanded angle (rotor position). The transformation block 30 includes a current function block 30A and a voltage function block 30B. The current and voltage function blocks 30A, 30B receive, respectively, the phase currents 101A,101B, 101C and the command voltages 102A,102B,102C that are provided to the drive 20 for application to the motor terminals 15A,15B,15C. Each of the function blocks 30A,30B also receive the angle command signal 110. The phase current and voltage information is transformed from the ABC-FoR to the $\alpha\beta$0-FoR, and then to the QDv-FoR Current signals 121,122 and voltage signals 123,124 are output by the transformation block 30 representing the current and voltage in the command reference frame.

The current and voltage signals 121–124 are received by an estimator block 32 from the transformation block 30.

Figure 5:
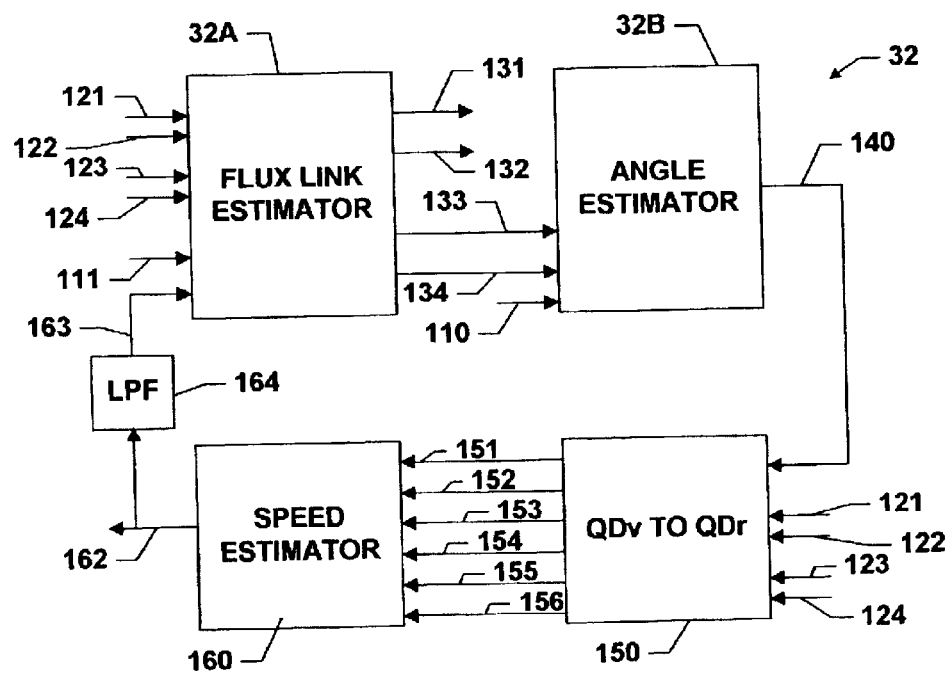
FIG. 5 is a block diagram conceptually illustrating a rotor angle and speed estimator in accordance with embodiments of the invention.

FIG. 5 shows the estimator 32 in further detail. The estimator 32 includes a flux linkage estimator 32A and an angle estimator 32B. The flux linkage estimator 32A receives the current and voltage signals 121–124 along with a speed command signal 111 from the controller 22 and a filtered representation of the estimated rotor speed 163 from a low pass filter 164. The flux linkage estimator 32A calculates an estimate of the total flux linkage and the magnet induced flux linkage in the command reference frame, and accordingly, outputs total flux linkage estimate signals 131, 132 and magnet flux linkage estimate signals 133,134. The angle estimator 32B then receives the magnet flux linkage signals 133, 134 and the angle command signal 110 to calculate an estimate of the actual rotor angle 140. The magnet flux linkage signals 133, 134 are received by the angle estimator 32B in the command reference frame, and transformed into the αβ0-FoR. The magnet flux estimates in the αβ0-FoR are then used to estimate the angular position of the rotor, and the corresponding signal 140 is output by the angle estimator 32B.

The rotor angle estimate signal 140 is provided to a QDv to QDr transformation function block 150 that uses this information to transform the voltage and current signals 121–124 from the command reference frame (rotating at the commanded speed in synchronism with the commanded angle (rotor position)) to a second, or "rotor," rotating reference frame that rotates in synchronism with the estimated actual rotor speed. The rotor reference frame is also referred to as the QDr frame of reference ("QDr-FoR").

The use of the two rotating frames (QDv-FoR and QDr-FoR) provides better response and high performance throughout speed range of the motor 12. Since the command reference frame, even initially, rotates at nearly the same speed as the rotor reference frame, the controller and estimator gains required are significantly reduced. The two rotating frames will quickly converge as the system approaches steady state, at which the first and second rotating frames will be rotating in synchronism. The result of the first and second rotating frames rotating at the same speed is the estimated magnet and total flux linkages become "DC" quantities, allowing the estimator error to become zero in steady state.

Figure 6:
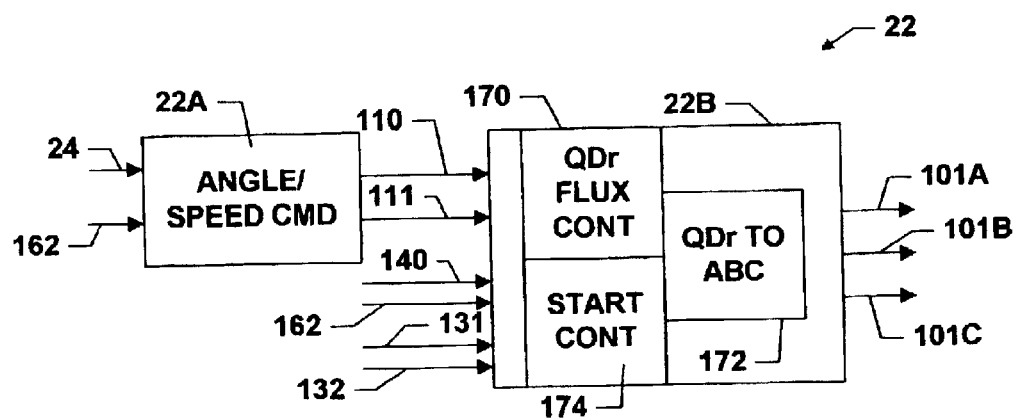
FIG. 6 is a block diagram conceptually illustrating aspects of a controller function block in accordance with embodiments of the present invention.

The transformation bock 150 outputs current signals 151, 152 and voltage signals 153,154 in the rotor reference frame. In certain embodiments, the current signals 151,152 are filtered and also provided to the speed estimator as input signals 155, 156. The current and voltage signals 151–156 in the rotor reference frame are then used by a speed calculator 160 to calculate an estimate of the actual rotor speed 162. The rotor angle and speed estimate signals 140,162 and the flux linkage estimate signals 131,132 are fed back to the controller 22. The controller 22 is generally shown in additional detail in FIG. 6. The controller 22 includes an angle and speed command generator 22A and a flux controller 22B. The angle and speed command generator 22A receives the speed demand and estimated speed signals 24, 162, and outputs the angle and speed command signals 110, 111 in response thereto.

The flux controller 22B includes a QDr flux controller 170 that operates in the rotor reference frame (rotating in synchronism with the estimated actual rotor speed). The QDr flux controller 170 transforms the flux linkage estimate signals 131,132 from the command reference frame (QDv-FoR) to the rotor reference frame (QDr-FoR). The speed command 111 and the estimated actual speed 140, and the transformed flux linkage signals 131,132 are applied to appropriate control laws to generate command voltage signals in the rotor reference frame, or QDr-FoR.

More specifically, the QDr flux controller 170 is where the commanded speed 111 is compared with the estimated speed 162, the total flux linkage estimates 131,132 in the QDv FoR are transformed into the QDr FoR. The total flux linkage references in the QDr FoR are generated from a predetermined map and the speed error. A feed forward term is added to the flux linkage references and flux linkage errors are generated. Finally, QDr command voltages are generated by QDr FoR flux linkage control laws acting upon the QDr FoR flux linkage errors. In alternative embodiments, a current controller is used in place of the QDr flux controller 170 to control current rather than flux.

The command voltage signals are then transformed from the QDr-FoR to the stationary αβ0-FoR, and then to the ABC-FoR in a transformation function block 172, which outputs the voltage command signals 102A,102B,102C. At start up, or zero speed, however, the terminal feedback 19 is not useful for operation of the QDr flux controller 170. Thus, an open loop start controller 174 is included in exemplary embodiments of the invention. The start controller 174 receives the speed command signal 110 from the angle and speed command generator 22A to generate an open loop angle command signal. Appropriate gain factors are applied to the angle command signal to generate open loop start voltage commands for each of the motor phases. The open loop start voltage commands are provided to the transformation block 172 to generate the appropriate voltage commands 102A,102B,102C. In other exemplary embodiments, the open loop start controller 174 is not used, and the necessary open loop start function is generated by the QDr flux controller 170, which generates a portion of the QDr FoR flux linkage reference that represents a nominal load characteristic.

A detailed block diagram is provided in the appendix hereto, illustrating the transforms and calculation details for an exemplary control system in accordance with embodiments of the present invention.

An example of an approach that may be used to implement the above described control system follows. It is assumed that the PM machine 12 comprises a PMAC motor using a three phase balanced feed. The phase flux linkage model for an ideal PMAC motor can be written as below in matrix form:

$$\begin{bmatrix} \lambda an(t) \\ \lambda bn(t) \\ \lambda cn(t) \end{bmatrix} = \begin{bmatrix} \lambda f \cdot \cos(\theta r(t)) \\ \lambda f \cdot \cos\left(\theta r(t) + \frac{-2}{3} \cdot \pi\right) \\ \lambda f \cdot \cos\left(\theta r(t) + \frac{-4}{3} \cdot \pi\right) \end{bmatrix} + \begin{bmatrix} Lls & -M & -M \\ -M & Lls & -M \\ -M & -M & Lls \end{bmatrix} \cdot \begin{bmatrix} Ia(t) \\ Ib(t) \\ Ic(t) \end{bmatrix} \quad (1)$$

The electrical (voltage) equation for the same PMAC machine can be written in general as:

$$\begin{bmatrix} Van(t) \\ Vbn(t) \\ Vcn(t) \end{bmatrix} = \begin{bmatrix} Ra & 0 & 0 \\ 0 & Rb & 0 \\ 0 & 0 & Rc \end{bmatrix} \cdot \begin{bmatrix} Ia(t) \\ Ib(t) \\ Ic(t) \end{bmatrix} + \begin{bmatrix} \frac{d}{dt}\lambda an(t) \\ \frac{d}{dt}\lambda bn(t) \\ \frac{d}{dt}\lambda cn(t) \end{bmatrix} \quad (2)$$

The magnet induced flux linkage can be written as.

$$\begin{bmatrix} \lambda f\_a(t) \\ \lambda f\_b(t) \\ \lambda f\_c(t) \end{bmatrix} = \begin{bmatrix} \lambda f \cdot \cos(\theta r(t)) \\ \lambda f \cdot \cos\left(\theta r(t) + \frac{-2}{3} \cdot \pi\right) \\ \lambda f \cdot \cos\left(\theta r(t) + \frac{-4}{3} \cdot \pi\right) \end{bmatrix} \quad (3)$$

The derivative with respect to time of the magnet flux linkage can be written as.

$$\begin{bmatrix} \frac{d}{dt}\lambda f\_a(t) \\ \frac{d}{dt}\lambda f\_b(t) \\ \frac{d}{dt}\lambda f\_c(t) \end{bmatrix} = \begin{bmatrix} -\lambda f \cdot \sin(\theta r(t)) \frac{d}{dt}\theta r(t) \\ -\lambda f \cdot \sin\left(\theta r(t) + \frac{-2}{3} \cdot \pi\right) \cdot \frac{d}{dt}\theta r(t) \\ -\lambda f \cdot \sin\left(\theta r(t) + \frac{-4}{3} \cdot \pi\right) \cdot \frac{d}{dt}\theta r(t) \end{bmatrix} \quad (4)$$

Each of equations 1–4 can be transformed into the αβ0 FoR by using C and C_inv. The transformation equations are written as.

$$f\alpha\beta 0 = f abc \quad (5)$$

$$fabc = C\_inv\, f\alpha\beta 0 \quad (6)$$

$$C = \begin{bmatrix} \frac{2}{3} & \frac{-1}{3} & \frac{-1}{3} \\ 0 & \frac{-1}{3} \cdot \sqrt{3} & \frac{1}{3} \cdot \sqrt{3} \\ \frac{1}{3} & \frac{1}{3} & \frac{1}{3} \end{bmatrix} \quad (7)$$

$$C\_inv = \begin{bmatrix} 1 & 0 & 1 \\ \frac{-1}{2} & \frac{-1}{2} \cdot \sqrt{3} & 1 \\ \frac{-1}{2} & \frac{1}{2} \cdot \sqrt{3} & 1 \end{bmatrix} \quad (8)$$

Equations 1–4 are thus transformed to the αβ0-FoR as follows. Equation 1, the phase flux linkage model for the ideal PMAC motor is written in the αβ0-FoR as below:

$$\begin{bmatrix} \lambda\alpha(t) \\ \lambda\beta(t) \\ \lambda 0(t) \end{bmatrix} = \quad (9)$$

$$\begin{bmatrix} \lambda f \cdot \cos(\theta r(t)) \\ -\lambda f \cdot \sin(\theta r(t)) \\ 0 \end{bmatrix} + \begin{bmatrix} Lls + M & 0 & 0 \\ 0 & Lls + M & 0 \\ 0 & 0 & Lls - 2 \cdot M \end{bmatrix} \cdot \begin{bmatrix} I\alpha(t) \\ I\beta(t) \\ I0(t) \end{bmatrix}$$

With Ra=Rb=Rc, Equation 2, the electrical (voltage) equation for the same PMAC machine, is written in the αβ0-FoR as $$\begin{bmatrix} V\alpha(t) \\ V\beta(t) \\ V0(t) \end{bmatrix} = \begin{bmatrix} R & 0 & 0 \\ 0 & R & 0 \\ 0 & 0 & R \end{bmatrix} \cdot \begin{bmatrix} I\alpha(t) \\ I\beta(t) \\ I0(t) \end{bmatrix} + \begin{bmatrix} \frac{d}{dt}\lambda\alpha(t) \\ \frac{d}{dt}\lambda\beta(t) \\ \frac{d}{dt}\lambda 0(t) \end{bmatrix} \quad (10)$$

Equation 3, the magnet induced flux linkage, is written in terms of αβ0 coordinates as $$\begin{bmatrix} \lambda f\_\alpha(t) \\ \lambda f\_\beta(t) \\ \lambda f\_0(t) \end{bmatrix} = \begin{bmatrix} \lambda f \cdot \cos(\theta r(t)) \\ -\lambda f \cdot \sin(\theta r(t)) \\ 0 \end{bmatrix} \quad (11)$$

Equation 4, the derivative with respect to time of the magnet induced flux linkage, is written in terms of αβ0 coordinates as $$\begin{bmatrix} \frac{d}{dt}\lambda f\_\alpha(t) \\ \frac{d}{dt}\lambda f\_\beta(t) \\ \frac{d}{dt}\lambda f\_0(t) \end{bmatrix} = \begin{bmatrix} -\lambda f \cdot \sin(\theta r(t)) \cdot \frac{d}{dt}\theta r(t) \\ -\lambda f \cdot \cos(\theta r(t)) \cdot \frac{d}{dt}\theta r(t) \\ 0 \end{bmatrix} \quad (12)$$

Solving Equation 9 for the αβ0 currents results in the following:

$$\begin{bmatrix} I\alpha(t) \\ I\beta(t) \\ I0(t) \end{bmatrix} = \begin{bmatrix} \frac{1}{(Lls + M)} & 0 & 0 \\ 0 & \frac{1}{(Lls + M)} & 0 \\ 0 & 0 & \frac{-1}{(-Lls + 2 \cdot M)} \end{bmatrix} \cdot \begin{bmatrix} \lambda\alpha(t) \\ \lambda\beta(t) \\ \lambda 0(t) \end{bmatrix} - \quad (13)$$

$$\begin{bmatrix} \frac{1}{(Lls + M)} & 0 & 0 \\ 0 & \frac{1}{(Lls + M)} & 0 \\ 0 & 0 & \frac{-1}{(-Lls + 2 \cdot M)} \end{bmatrix} \cdot \begin{bmatrix} \lambda f \cdot \cos(\theta r(t)) \\ -\lambda f \cdot \sin(\theta r(t)) \\ 0 \end{bmatrix}$$

Substituting Equation 13 into Equation 10 results in $$\begin{bmatrix} V\alpha(t) \\ V\beta(t) \\ V0(t) \end{bmatrix} = \begin{bmatrix} R & 0 & 0 \\ 0 & R & 0 \\ 0 & 0 & R \end{bmatrix} \cdot \left\{ \begin{bmatrix} \frac{1}{(Lls+M)} & 0 & 0 \\ 0 & \frac{1}{(Lls+M)} & 0 \\ 0 & 0 & \frac{-1}{(-Lls+2\cdot M)} \end{bmatrix} \cdot \begin{bmatrix} \lambda\alpha(t) \\ \lambda\beta(t) \\ \lambda 0(t) \end{bmatrix} \cdots \right. \\ \left. +(-1)\cdot \begin{bmatrix} \frac{1}{(Lls+M)} & 0 & 0 \\ 0 & \frac{1}{(Lls+M)} & 0 \\ 0 & 0 & \frac{-1}{(-Lls+2\cdot M)} \end{bmatrix} \cdot \begin{bmatrix} \lambda f\cdot \cos(\theta r(t)) \\ -\lambda f\cdot \sin(\theta r(t)) \\ 0 \end{bmatrix} \right\} + \begin{bmatrix} \frac{d}{dt}\lambda\alpha(t) \\ \frac{d}{dt}\lambda\beta(t) \\ \frac{d}{dt}\lambda 0(t) \end{bmatrix} \qquad (14)$$

Equation 14 can be simplified as follows:

$$\begin{bmatrix} V\alpha(t) \\ V\beta(t) \\ V0(t) \end{bmatrix} = \begin{bmatrix} \frac{R}{(Lls+M)} & 0 & 0 \\ 0 & \frac{R}{(Lls+M)} & 0 \\ 0 & 0 & \frac{-R}{(-Lls+2\cdot M)} \end{bmatrix} \cdot \begin{bmatrix} \lambda\alpha(t) \\ \lambda\beta(t) \\ \lambda 0(t) \end{bmatrix} \cdots \\ + \begin{bmatrix} \frac{-R}{(Lls+M)} & 0 & 0 \\ 0 & \frac{-R}{(Lls+M)} & 0 \\ 0 & 0 & \frac{R}{(-Lls+2\cdot M)} \end{bmatrix} \cdot \begin{bmatrix} \lambda f\cdot \cos(\theta r(t)) \\ -\lambda f\cdot \sin(\theta r(t)) \\ 0 \end{bmatrix} + \begin{bmatrix} \frac{d}{dt}\lambda\alpha(t) \\ \frac{d}{dt}\lambda\beta(t) \\ \frac{d}{dt}\lambda 0(t) \end{bmatrix} \qquad (15)$$

Solving for the derivatives of the flux linkages with respect to time results in $$\begin{bmatrix} \frac{d}{dt}\lambda\alpha(t) \\ \frac{d}{dt}\lambda\beta(t) \\ \frac{d}{dt}\lambda 0(t) \end{bmatrix} = \begin{bmatrix} V\alpha(t) \\ V\beta(t) \\ V0(t) \end{bmatrix} - \left\{ \begin{bmatrix} \frac{R}{(Lls+M)} & 0 & 0 \\ 0 & \frac{R}{(Lls+M)} & 0 \\ 0 & 0 & \frac{-R}{(-Lls+2\cdot M)} \end{bmatrix} \cdot \begin{bmatrix} \lambda\alpha(t) \\ \lambda\beta(t) \\ \lambda 0(t) \end{bmatrix} \cdots \\ + \begin{bmatrix} \frac{-R}{(Lls+M)} & 0 & 0 \\ 0 & \frac{-R}{(Lls+M)} & 0 \\ 0 & 0 & \frac{R}{(-Lls+2\cdot M)} \end{bmatrix} \cdot \begin{bmatrix} \lambda f\cdot \cos(\theta r(t)) \\ -\lambda f\cdot \sin(\theta r(t)) \\ 0 \end{bmatrix} \right\} \qquad (16)$$

The other equation used to build the state model of the system is the torque equation. Assuming that the load torque is all inertial:

$$J\cdot \frac{d^2}{dt^2}(\theta r(t)) = Te(I\alpha, I\beta, I0, \theta r) = \qquad (17)$$

$$\left(-\lambda f\cdot \frac{Np}{2}\right)\cdot \begin{bmatrix} \frac{3}{2}\cdot \sin(\theta r(t)) & \frac{3}{2}\cdot \cos(\theta r(t)) & 0 \end{bmatrix} \cdot \begin{bmatrix} I\alpha \\ I\beta \\ I0 \end{bmatrix}$$

Solving for angular velocity ($\omega r\_dot$):

$$\omega r\_dot(t) = \frac{-3\cdot \lambda f}{2\cdot J}\cdot \frac{Np}{2}\cdot (\sin(\theta r(t))\cos(\theta r(t))0)\cdot \begin{bmatrix} I\alpha \\ I\beta \\ I0 \end{bmatrix} \qquad (18)$$

Substituting for I$\alpha$(t) and I$\beta$(t) from equation (13) results in the following:

$$\omega r\_dot(t) = \frac{-3\cdot \lambda f}{2\cdot J}\cdot \frac{Np}{2}\cdot (\sin(\theta r(t))\cos(\theta r(t)))\cdot \qquad (19)$$

-continued $$\begin{bmatrix} \frac{1}{(Lls+M)} \cdot \lambda\alpha(t) - \frac{1}{(Lls+M)} \cdot \lambda f \cdot \cos(\theta r(t)) \\ \frac{1}{(Lls+M)} \cdot \lambda\beta(t) + \frac{1}{(Lls+M)} \cdot \lambda f \cdot \sin(\theta r(t)) \end{bmatrix}$$

Simplifying and writing the torque equation in terms of the total flux linkage and magnet flux linkage $\lambda f\_x$'s and $\lambda x$'s only gives $$\omega r\_dot(t) = \left(\frac{3}{2}\right) \cdot \frac{Np}{2} \cdot \frac{1}{(J \cdot (Lls+M))} \cdot \lambda f\_\beta(t) \cdot \lambda\alpha(t) - \left(\frac{3}{2}\right) \cdot \frac{Np}{2} \cdot \frac{1}{(J \cdot (Lls+M))} \cdot \lambda f\_\alpha(t) \cdot \lambda\beta(t) \quad (20)$$

A state equation can now be formulated with $\lambda\alpha$, $\lambda\beta$, $\lambda f\_\alpha$, $\lambda f\_\beta$, $\omega r$ as state variables using Equations 17, 16, 11 and 12.

$$\begin{bmatrix} \frac{d}{dt}\lambda\alpha(t) \\ \frac{d}{dt}\lambda\beta(t) \\ \frac{d}{dt}\lambda f\_\alpha(t) \\ \frac{d}{dt}\lambda f\_\beta(t) \\ \frac{d}{dt}\omega r(t) \end{bmatrix} = \begin{bmatrix} \frac{-R}{(Lls+M)} & 0 & \frac{R}{(Lls+M)} & 0 & 0 \\ 0 & \frac{-R}{(Lls+M)} & 0 & \frac{R}{(Lls+M)} & 0 \\ 0 & 0 & 0 & 0 & 0 \\ 0 & 0 & 0 & 0 & 0 \\ 0 & 0 & 0 & 0 & 0 \end{bmatrix} \cdot \begin{bmatrix} \lambda\alpha(t) \\ \lambda\beta(t) \\ \lambda f\_\alpha(t) \\ \lambda f\_\beta(t) \\ \omega r(t) \end{bmatrix} - \begin{bmatrix} 0 \\ 0 \\ \lambda f\_\beta(t) \cdot \omega r(t) \\ -(\lambda f\_\alpha(t) \cdot \omega r(t)) \\ \frac{3}{2} \cdot \frac{Np}{2} \cdot \frac{1}{(J \cdot (Lls+M))} \cdot \lambda f\_\beta(t) \cdot \lambda\alpha(t) - \frac{3}{2} \cdot \frac{Np}{2} \cdot \frac{1}{(J \cdot (Lls+M))} \cdot \lambda f\_\alpha(t) \cdot \lambda\beta(t) \end{bmatrix} + \begin{bmatrix} 1 & 0 \\ 0 & 1 \\ 0 & 0 \\ 0 & 0 \\ 0 & 0 \end{bmatrix} \cdot \begin{bmatrix} V\alpha(t) \\ V\beta(t) \end{bmatrix} \quad (21)$$

Equation 21 is non-linear in that the second term on the right side of the equation contains products of state variables. Equation 22 is linearized about "past values" (the past values being designated by xxxx_nom) of the state variables under the assumption that the estimator will converge much faster than the operating point defined by the "past values" will change. However, with the suggested approach using $\alpha\beta$ variables, the estimated variables change at a cyclic rate that corresponds to the motor electrical frequency. The assumption will essentially "fall apart" as the motor electrical frequency gets close to the "poles" of the linearized estimator. The problem can be alleviated if the estimated variables are transformed into a frame of reference attached to the rotor in which the state variables will be DC quantities in steady state operation.

$$\begin{bmatrix} \frac{d}{dt}\lambda\alpha(t) \\ \frac{d}{dt}\lambda\beta(t) \\ \frac{d}{dt}\lambda f\_\alpha(t) \\ \frac{d}{dt}\lambda f\_\beta(t) \\ \frac{d}{dt}\omega r(t) \end{bmatrix} = \begin{bmatrix} \frac{-R}{(Lls+M)} & 0 & \frac{R}{(Lls+M)} & 0 & 0 \\ 0 & \frac{-R}{(Lls+M)} & 0 & \frac{R}{(Lls+M)} & 0 \\ 0 & 0 & 0 & \omega r\_nom(t) & \lambda f\_\beta\_nom(t) \\ 0 & 0 & -\omega r\_nom(t) & 0 & -\lambda f\_m\_nom(t) \\ \frac{3}{2} \cdot \frac{Np}{2} \cdot \frac{1}{(J \cdot (Lls+M))} \cdot \lambda f\_\beta\_nom(t) & -\frac{3}{2} \cdot \frac{\frac{Np}{2}}{(J \cdot (Lls+M))} \cdot \lambda f\_\alpha\_nom(t) & -\frac{3}{2} \cdot \frac{\frac{Np}{2}}{(J \cdot (Lls+M))} \cdot \lambda\beta\_nom(t) & \frac{3}{2} \cdot \frac{\frac{Np}{2}}{(J \cdot (Lls+M))} \cdot \lambda\alpha\_nom(t) & 0 \end{bmatrix} \cdot \begin{bmatrix} \lambda\alpha(t) \\ \lambda\beta(t) \\ \lambda f\_\alpha(t) \\ \lambda f\_\beta(t) \\ \omega r(t) \end{bmatrix} + \quad (22)$$

$$\begin{bmatrix} 1 & 0 \\ 0 & 1 \\ 0 & 0 \\ 0 & 0 \\ 0 & \square \end{bmatrix} \cdot \begin{bmatrix} V\alpha(t) \\ V\beta(t) \end{bmatrix}$$

A measurement equation that generates estimated $\alpha\beta$ currents ($I\alpha\_\text{hat}(t)$ and $I\beta\_\text{hat}(t)$) from the flux linkage estimates can be derived from Equation 13 and written as follows:

$$\begin{bmatrix} I\alpha\_\text{hat}(t) \\ I\beta\_\text{hat}(t) \end{bmatrix} = \begin{bmatrix} \frac{1}{(Lls+M)} & 0 & -\left[\frac{1}{(Lls+M)}\right] & 0 & 0 \\ 0 & \frac{1}{(Lls+M)} & 0 & -\left[\frac{1}{(Lls+M)}\right] & 0 \end{bmatrix} \cdot \begin{bmatrix} \lambda\alpha(t) \\ \lambda\beta(t) \\ \lambda f\_\alpha(t) \\ \lambda f\_\beta(t) \\ \omega r(t) \end{bmatrix} \quad (23)$$

The transformation between the stationary $\alpha\beta 0$-FoR and the QDv-FoR (rotating in synchronism with the commanded speed $\theta v(t)$) can be written as.

$$KQDv\_\alpha\beta = \begin{bmatrix} \cos(\theta v(t)) & -\sin(\theta v(t)) \\ \sin(\theta v(t)) & \cos(\theta v(t)) \end{bmatrix} \quad (24)$$

$$KQDv\_\alpha\beta\_\text{inv} = \begin{bmatrix} \cos(\theta v(t)) & \sin(\theta v(t)) \\ -\sin(\theta v(t)) & \cos(\theta v(t)) \end{bmatrix} \quad (25)$$

$$KQDv\_\alpha\beta\_\text{inv\_dot} = \begin{bmatrix} -\sin(\theta v(t)) & \cos(\theta v(t)) \\ -\cos(\theta v(t)) & -\sin(\theta v(t)) \end{bmatrix} \quad (26)$$

The relationship between the $\alpha\beta 0$-FoR and the QDv-FoR variables is $$fQDv = KQDv\_\alpha\beta \cdot f\alpha\beta \quad (27)$$

$$f\alpha\beta = KQDv\_\alpha\beta\_\text{inv} \cdot fQDv \quad (28)$$

Equations 16 and 20 are transformed from the $\alpha\beta 0$-FoR into the QDv-FoR as follows. Equation 16 is rewritten with $\lambda f\_\alpha(t)$ and $\lambda f\_\beta(t)$ substituted for the $\cos(\theta r(t))$ and $\sin(\theta r(t))$ terms, and Equation 20 is written in vector form.

$$\begin{bmatrix} \frac{d}{dt}\lambda\alpha(t) \\ \frac{d}{dt}\lambda\beta(t) \end{bmatrix} = \begin{bmatrix} V\alpha(t) \\ V\beta(t) \end{bmatrix} - \begin{bmatrix} \frac{R}{(Lls+M)} & 0 \\ 0 & \frac{R}{(Lls+M)} \end{bmatrix} \cdot \begin{bmatrix} \lambda\alpha(t) \\ \lambda\beta(t) \end{bmatrix} - \begin{bmatrix} \frac{-R}{(Lls+M)} & 0 \\ 0 & \frac{-R}{(Lls+M)} \end{bmatrix} \cdot \begin{bmatrix} \lambda f\_\alpha(t) \\ \lambda f\_\beta(t) \end{bmatrix} \quad (29)$$

$$\omega r\_\text{dot}(t) = \frac{3}{2} \cdot \frac{\frac{Np}{2}}{(J \cdot (Lls+M))} \cdot (-\lambda\beta(t)\lambda\alpha(t)) \cdot \begin{bmatrix} \lambda f\_\alpha(t) \\ \lambda f\_\beta(t) \end{bmatrix} \quad (30)$$

Equation 30 is rewritten in terms of the state variables $\lambda\alpha(t)$, $\lambda\beta(t)$, $\lambda f\_\alpha(t)$ and $\lambda f\_\beta(t)$.

$$\omega r\_\text{dot}(t) = \frac{3}{2} \cdot \frac{\frac{Np}{2}}{(J \cdot (Lls+M))} \cdot \left[\begin{bmatrix} 0 & -1 \\ 1 & 0 \end{bmatrix} \cdot \begin{bmatrix} \lambda\alpha(t) \\ \lambda\beta(t) \end{bmatrix}\right]^T \cdot \begin{bmatrix} \lambda f\_\alpha(t) \\ \lambda f\_\beta(t) \end{bmatrix} \quad (31)$$

Equations 29 and 31 are now transformed into the QDv-FoR, substituting for the $\alpha\beta$ variables using the relationship described by equation (28):

$$\frac{d}{dt}\left[\begin{bmatrix}\cos(\theta v(t)) & \sin(\theta v(t))\\ -\sin(\theta v(1)) & \cos(\beta v(t))\end{bmatrix}\cdot\begin{bmatrix}\lambda qv(t)\\ \lambda dv(t)\end{bmatrix}\right] = \begin{bmatrix}\cos(\theta v(t)) & \sin(\theta v(t))\\ -\sin(\theta v(t)) & \cos(\theta v(t))\end{bmatrix}\cdot \quad (32)$$
$$\left\{\begin{bmatrix}Vqv(t)\\ Vdv(t)\end{bmatrix} - \begin{bmatrix}\frac{R}{(Lls+M)} & 0\\ 0 & \frac{R}{(Lls+M)}\end{bmatrix}\cdot \begin{bmatrix}\cos(\theta v(t)) & \sin(\theta v(t))\\ -\sin(\theta v(t)) & \cos(\theta v(t))\end{bmatrix}\cdot\begin{bmatrix}\lambda qv(t)\\ \lambda dv(t)\end{bmatrix}\right\} + $$
$$(-1)\cdot\begin{bmatrix}\frac{-R}{(Lls+M)} & 0\\ 0 & \frac{-R}{(Lls+M)}\end{bmatrix}\cdot\begin{bmatrix}\cos(\theta v(t)) & \sin(\theta v(t))\\ -\sin(\theta v(t)) & \cos(\theta v(t))\end{bmatrix}\cdot\begin{bmatrix}\lambda qv(t)\\ \lambda dv(t)\end{bmatrix}$$

$$\omega r\_dot(t) = \frac{3}{2}\cdot\frac{\frac{Np}{2}}{(J\cdot(Lls+M))}\cdot\left[\begin{bmatrix}0 & -1\\ 1 & 0\end{bmatrix}\cdot\begin{bmatrix}\cos(\theta v(t)) & \sin(\theta v(t))\\ -\sin(\theta v(t)) & \cos(\theta v(t))\end{bmatrix}\cdot\right.$$
$$\left.\begin{bmatrix}\lambda qv(t)\\ \lambda dv(t)\end{bmatrix}\right]^T\cdot\begin{bmatrix}\cos(\theta v(t)) & \sin(\theta v(t))\\ -\sin(\theta v(t)) & \cos(\theta v(t))\end{bmatrix}\cdot\begin{bmatrix}\lambda f\_qv(t)\\ \lambda f\_dv(t)\end{bmatrix} \quad (33)$$

The left side of Equation 32 is expanded:

$$\begin{bmatrix}\cos(\theta v(t)) & \sin(\theta v(t))\\ -\sin(\theta v(t)) & \cos(\theta v(t))\end{bmatrix}\frac{d}{dt}\begin{bmatrix}\lambda qv(t)\\ \lambda dv(t)\end{bmatrix} + \quad (34)$$
$$\theta r\_dot(t)\cdot\begin{bmatrix}-\sin(\theta v(t)) & \cos(\theta v(t))\\ -\cos(\theta v(t)) & -\sin(\theta v(t))\end{bmatrix}\cdot\begin{bmatrix}\lambda qv(t)\\ \lambda dv(t)\end{bmatrix} =$$
$$\begin{bmatrix}\cos(\theta v(t)) & \sin(\theta v(t))\\ -\sin(\theta v(t)) & \cos(\theta v(t))\end{bmatrix}\cdot\begin{bmatrix}\lambda qv(t)\\ \lambda dv(t)\end{bmatrix} +$$
$$(-1)\cdot\begin{bmatrix}\frac{R}{(Lls+M)} & 0\\ 0 & \frac{R}{(Lls+M)}\end{bmatrix}\cdot\begin{bmatrix}\cos(\theta v(t)) & \sin(\theta v(t))\\ -\sin(\theta v(t)) & \cos(\theta v(t))\end{bmatrix}\cdot$$
$$\begin{bmatrix}\lambda qv(t)\\ \lambda dv(t)\end{bmatrix} + (-1)\cdot\begin{bmatrix}\frac{-R}{(Lls+M)} & 0\\ 0 & \frac{-R}{(Lls+M)}\end{bmatrix}\cdot$$
$$\begin{bmatrix}\cos(\theta v(t)) & \sin(\theta v(t))\\ -\sin(\theta v(t)) & \cos(\theta v(t))\end{bmatrix}\begin{bmatrix}\lambda f\_qv(t)\\ \lambda f\_dv(t)\end{bmatrix}$$

Both sides of Equation 35 can be multiplied by KQDv_αβ as given by Equation 24:

$$\frac{d}{dt}\begin{bmatrix}\lambda qv(t)\\ \lambda dv(t)\end{bmatrix} + \theta v\_dot(t)\cdot\begin{bmatrix}0 & 1\\ -1 & 0\end{bmatrix}\cdot \quad (35)$$
$$\begin{bmatrix}\lambda qv(t)\\ \lambda dv(t)\end{bmatrix} = \begin{bmatrix}Vqv(t)\\ Vdv(t)\end{bmatrix} + \begin{bmatrix}\frac{-R}{(Lls+M)} & 0\\ 0 & \frac{-R}{(Lls+M)}\end{bmatrix}\cdot$$
$$\begin{bmatrix}Vqv(t)\\ Vdv(t)\end{bmatrix} + \begin{bmatrix}\frac{R}{(Lls+M)} & 0\\ 0 & \frac{R}{(Lls+M)}\end{bmatrix}\cdot\begin{bmatrix}\lambda f\_qv(t)\\ \lambda f\_dv(t)\end{bmatrix}$$

Solving for $d/dt(\lambda qv(t))$ and $d/dt(\lambda dv(t))$ results in:

$$\frac{d}{dt}\begin{bmatrix}\lambda qv(t)\\ \lambda dv(t)\end{bmatrix} = \begin{bmatrix}Vqv(t)\\ Vdv(t)\end{bmatrix} + \begin{bmatrix}\frac{-R}{(Lls+M)} & 0\\ 0 & \frac{-R}{(Lls+M)}\end{bmatrix}\cdot \quad (36)$$
$$\begin{bmatrix}\lambda qv(t)\\ \lambda dv(t)\end{bmatrix} + \begin{bmatrix}\frac{R}{(Lls+M)} & 0\\ 0 & \frac{R}{(Lls+M)}\end{bmatrix}\cdot$$
$$\begin{bmatrix}\lambda f\_qv(t)\\ \lambda f\_dv(t)\end{bmatrix} + \theta v\_dot(t)\cdot\begin{bmatrix}0 & -1\\ 1 & 0\end{bmatrix}\cdot\begin{bmatrix}\lambda f\_qv(t)\\ \lambda f\_dv(t)\end{bmatrix}$$

Equation 34 can also be simplified as follows.

$$\omega r\_dot(t) = \frac{3}{2}\cdot\frac{\frac{Np}{2}}{(J\cdot(Lls+M))}\cdot(-\lambda dv(t)\lambda qv(t))\cdot\begin{bmatrix}\lambda f\_qv(t)\\ \lambda f\_dv(t)\end{bmatrix} \quad (37)$$

Equations 11 and 12 (repeated below with only the αβ terms) are used to deduce the relationship between $\lambda f\_\alpha(t)$, $\lambda f\_\beta(t)$ and $d/dt(\lambda f\_\alpha(t))$, $d/dt(\lambda f\_\beta(t))$.

$$\begin{bmatrix}\lambda f\_\alpha(t)\\ \lambda f\_\beta(t)\end{bmatrix} = \begin{bmatrix}\lambda f\cdot\cos(\theta r(t))\\ -\lambda f\cdot\sin(\theta r(t))\end{bmatrix} \quad (11)$$

$$\begin{bmatrix}\frac{d}{dt}\lambda f\_\alpha(t)\\ \frac{d}{dt}\lambda f\_\beta(t)\end{bmatrix} = \begin{bmatrix}-\lambda f\cdot\sin(\theta r(t))\\ -\lambda f\cdot\cos(\theta r(t))\end{bmatrix}\cdot\omega r(t) \quad (12)$$

Equations 11 and 12 imply $$\begin{bmatrix}\frac{d}{dt}\lambda f\_\alpha(t)\\ \frac{d}{dt}\lambda f\_\beta(t)\end{bmatrix} = \begin{bmatrix}\lambda f\_\beta(t)\\ \lambda f\_\alpha(t)\end{bmatrix}\cdot\omega r(t) = \begin{bmatrix}0 & 1\\ -1 & 0\end{bmatrix}\cdot\begin{bmatrix}\lambda f\_\alpha(t)\\ \lambda f\_\beta(t)\end{bmatrix}\cdot\omega r(t) \quad (38)$$

Equation 38 is transformed into the QDV-FoR (rotating with θv(t)), for the αβ0-FoR variables using the relationship shown in Equation 28.

$$\frac{d}{dt}\left[\begin{bmatrix} \cos(\theta v(t)) & \sin(\theta v(t)) \\ -\sin(\theta v(t)) & \cos(\theta v(t)) \end{bmatrix} \cdot \begin{bmatrix} \lambda f\_qv(t) \\ \lambda f\_dv(t) \end{bmatrix}\right] = \qquad (39)$$

$$\begin{bmatrix} 0 & 1 \\ -1 & 0 \end{bmatrix} \cdot \begin{bmatrix} \cos(\theta v(t)) & \sin(\theta v(t)) \\ -\sin(\theta v(t)) & \cos(\theta v(t)) \end{bmatrix} \cdot \begin{bmatrix} \lambda f\_qv(t) \\ \lambda f\_dv(t) \end{bmatrix} \cdot \omega r(t)$$

The left side of Equation 39 is expanded as follows:

$$\begin{bmatrix} \cos(\theta v(t)) & \sin(\theta v(t)) \\ -\sin(\theta v(t)) & \cos(\theta v(t)) \end{bmatrix} \cdot \begin{bmatrix} \frac{d}{dt}\lambda f\_qv(t) \\ \frac{d}{dt}\lambda f\_dv(t) \end{bmatrix} + \qquad (40)$$

$$\begin{bmatrix} -\sin(\theta v(t)) & \cos(\theta v(t)) \\ -\cos(\theta v(t)) & -\sin(\theta v(t)) \end{bmatrix} \cdot \begin{bmatrix} \lambda f\_qv(t) \\ \lambda f\_dv(t) \end{bmatrix} \cdot \theta v\_dot(t) =$$

$$\begin{bmatrix} 0 & 1 \\ -1 & 0 \end{bmatrix} \cdot \begin{bmatrix} \cos(\theta v(t)) & \sin(\theta v(t)) \\ -\sin(\theta v(t)) & \cos(\theta v(t)) \end{bmatrix} \cdot \begin{bmatrix} \lambda f\_qv(t) \\ \lambda f\_dv(t) \end{bmatrix} \cdot \omega r(t)$$

Both sides of Equation 40 are now multiplied by KQDv_αβ.

$$\begin{bmatrix} \frac{d}{dt}\lambda f\_qv(t) \\ \frac{d}{dt}\lambda f\_dv(t) \end{bmatrix} + \qquad (41)$$

$$\begin{bmatrix} 0 & 1 \\ -1 & 0 \end{bmatrix} \cdot \begin{bmatrix} \lambda f\_qv(t) \\ \lambda f\_dv(t) \end{bmatrix} \cdot \theta v\_dot(t) = \begin{bmatrix} 0 & 1 \\ -1 & 0 \end{bmatrix} \cdot \begin{bmatrix} \lambda f\_qv(t) \\ \lambda f\_dv(t) \end{bmatrix} \cdot \omega r(t)$$

Solving for d/dt(λf_qv(t)) and d/dt(λf_dv(t)) results in $$\begin{bmatrix} \frac{d}{dt}\lambda f\_qv(t) \\ \frac{d}{dt}\lambda f\_dv(t) \end{bmatrix} = \qquad (42)$$

$$\begin{bmatrix} 0 & 1 \\ -1 & 0 \end{bmatrix} \cdot \begin{bmatrix} \lambda f\_qv(t) \\ \lambda f\_dv(t) \end{bmatrix} \cdot \omega r(t) + \begin{bmatrix} 0 & -1 \\ 1 & 0 \end{bmatrix} \cdot \begin{bmatrix} \lambda f\_qv(t) \\ \lambda f\_dv(t) \end{bmatrix} \cdot \omega v(t)$$

Equation 42 is shown in simplified form below.

$$\begin{bmatrix} \frac{d}{dt}\lambda f\_qv(t) \\ \frac{d}{dt}\lambda f\_dv(t) \end{bmatrix} = \begin{bmatrix} 0 & (\omega r(t) - \omega v(t)) \\ -(\omega r(t) - \omega v(t)) & 0 \end{bmatrix} \cdot \begin{bmatrix} \lambda f\_qv(t) \\ \lambda f\_dv(t) \end{bmatrix} \qquad (43)$$

Equations 36, 37 and 43, the three equations that can be used to construct the state model of the system, are repeated below.

$$\frac{d}{dt}\begin{bmatrix} \lambda qv(t) \\ \lambda dv(t) \end{bmatrix} = \begin{bmatrix} Vqv(t) \\ Vdv(t) \end{bmatrix} + \begin{bmatrix} \frac{-R}{(Lls+M)} & 0 \\ 0 & \frac{-R}{(Lls+M)} \end{bmatrix} \cdot \begin{bmatrix} \lambda qv(t) \\ \lambda dv(t) \end{bmatrix} + \qquad (36)$$

$$\begin{bmatrix} \frac{R}{(Lls+M)} & 0 \\ 0 & \frac{R}{Lls+M} \end{bmatrix} \cdot \begin{bmatrix} \lambda f\_qv(t) \\ \lambda f\_dv(t) \end{bmatrix} + \omega v(t) \cdot \begin{bmatrix} 0 & -1 \\ 1 & 0 \end{bmatrix} \cdot \begin{bmatrix} \lambda qv(t) \\ \lambda dv(t) \end{bmatrix}$$

$$\omega r\_dot(t) = \frac{3}{2} \cdot \frac{\frac{Np}{2}}{(J \cdot (Lls+M))} \cdot (-\lambda dv(t)\ \lambda qv(t)) \cdot \begin{bmatrix} \lambda f\_qv(t) \\ \lambda f\_dv(t) \end{bmatrix} \qquad (37)$$

$$\begin{bmatrix} \frac{d}{dt}\lambda f\_qv(t) \\ \frac{d}{dt}\lambda f\_dv(t) \end{bmatrix} = \begin{bmatrix} 0 & (\omega r(t) - \omega v(t)) \\ -(\omega r(t) - \omega v(t)) & 0 \end{bmatrix} \cdot \begin{bmatrix} \lambda f\_qv(t) \\ \lambda f\_dv(t) \end{bmatrix} \qquad (43)$$

A non-linear state equation for the five state variables, $$\begin{bmatrix} \lambda qv(t) \\ \lambda dv(t) \\ \lambda f\_qv(t) \\ \lambda f\_dv(t) \\ \omega r\_dot(t) \end{bmatrix},$$

can be written as $$\begin{bmatrix} \frac{d}{dt}\lambda qv(t) \\ \frac{d}{dt}\lambda dv(t) \\ \frac{d}{dt}\lambda f\_qv(t) \\ \frac{d}{dt}\lambda f\_dv(t) \\ \frac{d}{dt}\omega r(t) \end{bmatrix} = \begin{bmatrix} \frac{-R}{(Lls+M)} & -\omega v(t) & \frac{R}{(Lls+M)} & 0 & 0 \\ \omega v(t) & \frac{-R}{(Lls+M)} & 0 & \frac{R}{Lls+M} & 0 \\ 0 & 0 & 0 & 0 & 0 \\ 0 & 0 & 0 & 0 & 0 \\ 0 & 0 & 0 & 0 & 0 \end{bmatrix} \cdot \begin{bmatrix} \lambda qv(t) \\ \lambda dv(t) \\ \lambda f\_qv(t) \\ \lambda f\_dv(t) \\ \omega r(t) \end{bmatrix} + \qquad (44)$$

$$\begin{bmatrix} 0 \\ 0 \\ (\omega r(t)-\omega v(t)) \cdot \lambda f\_dv(t) \\ -(\omega r(t)-\omega v(t)) \cdot \lambda f\_qv(t) \\ \frac{3}{2} \cdot \frac{\frac{Np}{2}}{(J \cdot (Lls+M))} \cdot (-\lambda dv(t) \cdot \lambda f\_qv(t) + \lambda qv(t) \cdot \lambda f\_dv(t)) \end{bmatrix} + \begin{bmatrix} 1 & 0 \\ 0 & 1 \\ 0 & 0 \\ 0 & 0 \\ 0 & 0 \end{bmatrix} \cdot \begin{bmatrix} Vqv(t) \\ Vdv(t) \end{bmatrix}$$

Next, Equation 13 is transformed into the QDv-FoR as a means to generate the measurement equation in the QDv-FoR. Equation 13 is repeated as follows:

$$\begin{bmatrix} I\alpha(t) \\ I\beta(t) \\ I0(t) \end{bmatrix} = \begin{bmatrix} \frac{1}{(Lls+M)} & 0 & 0 \\ 0 & \frac{1}{(Lls+M)} & 0 \\ 0 & 0 & \frac{-1}{(-Lls+2\cdot M)} \end{bmatrix} \cdot \qquad (13)$$

$$\begin{bmatrix} \lambda\alpha(t) \\ \lambda\beta(t) \\ \lambda0(t) \end{bmatrix} - \begin{bmatrix} \frac{1}{(Lls+M)} & 0 & 0 \\ 0 & \frac{1}{(Lls+M)} & 0 \\ 0 & 0 & \frac{-1}{(-Lls+2\cdot M)} \end{bmatrix} \cdot$$

$$\begin{bmatrix} \lambda f \cdot \cos(\theta r(t)) \\ -\lambda f \cdot \sin(\theta r(t)) \\ 0 \end{bmatrix}$$

The following shows Equation 13 written in terms of the αβ-FoR fluxes only.

$$\begin{bmatrix} I\alpha(t) \\ I\beta(t) \end{bmatrix} = \begin{bmatrix} \frac{1}{(Lls+M)} & 0 \\ 0 & \frac{1}{(Lls+M)} \end{bmatrix} \cdot \qquad (45)$$

$$\begin{bmatrix} \lambda\alpha(t) \\ \lambda\beta(t) \end{bmatrix} - \begin{bmatrix} \frac{1}{(Lls+M)} & 0 \\ 0 & \frac{1}{(Lls+M)} \end{bmatrix} \cdot \begin{bmatrix} \lambda f\_\alpha(t) \\ \lambda f\_\beta(t) \end{bmatrix}$$

Substituting for the αβ-FoR variables results in $$\begin{bmatrix} \cos(\theta v(t)) & \sin(\theta v(t)) \\ -\sin(\theta v(t)) & \cos(\theta v(t)) \end{bmatrix} \cdot \begin{bmatrix} Iqv(t) \\ Idv(t) \end{bmatrix} = \begin{bmatrix} \frac{1}{(Lls+M)} & 0 \\ 0 & \frac{1}{(Lls+M)} \end{bmatrix} \cdot \qquad (46)$$

$$\begin{bmatrix} \cos(\theta v(t)) & \sin(\theta v(t)) \\ -\sin(\theta v(t)) & \cos(\theta v(t)) \end{bmatrix} \cdot \begin{bmatrix} \lambda qv(t) \\ \lambda dv(t) \end{bmatrix} -$$

$$\begin{bmatrix} \frac{1}{(Lls+M)} & 0 \\ 0 & \frac{1}{(Lls+M)} \end{bmatrix} \cdot \begin{bmatrix} \cos(\theta v(t)) & \sin(\theta v(t)) \\ -\sin(\theta v(t)) & \cos(\theta v(t)) \end{bmatrix} \cdot \begin{bmatrix} \lambda f\_qv(t) \\ \lambda f\_dv(t) \end{bmatrix}$$

Equation 46 is shown below with both sides of the equation multiplied by KQDv_αβ.

$$\begin{bmatrix} Iqv(t) \\ Idv(t) \end{bmatrix} = \begin{bmatrix} \frac{1}{(Lls+M)} & 0 \\ 0 & \frac{1}{(Lls+M)} \end{bmatrix} \cdot \qquad (47)$$

$$\begin{bmatrix} \lambda qv(t) \\ \lambda dv(t) \end{bmatrix} - \begin{bmatrix} \frac{1}{(Lls+M)} & 0 \\ 0 & \frac{1}{(Lls+M)} \end{bmatrix} \cdot \begin{bmatrix} \lambda f\_qv(t) \\ \lambda f\_dv(t) \end{bmatrix}$$

In standard state variable form, the estimated QDv-FoR currents can be expressed $$\begin{bmatrix} \text{Iqv\_hat}(t) \\ \text{Iqv\_hat}(t) \end{bmatrix} = \begin{bmatrix} \frac{1}{(Lls+M)} & 0 & -\frac{1}{(Lls+M)} & 0 & 0 \\ 0 & \frac{1}{(Lls+M)} & 0 & -\frac{1}{(Lls+M)} & 0 \end{bmatrix} \begin{bmatrix} \lambda qv(t) \\ \lambda dv(t) \\ \lambda f\_qv(t) \\ \lambda f\_dv(t) \\ \omega r(t) \end{bmatrix} \qquad (48)$$

Equation 48 (above), along with Equation 44 (repeated below) form the state model in standard form for the system.

$$\begin{bmatrix} \frac{d}{dt}\lambda qv(t) \\ \frac{d}{dt}\lambda dv(t) \\ \frac{d}{dt}\lambda f\_qv(t) \\ \frac{d}{dt}\lambda f\_dv(t) \\ \frac{d}{dt}\omega r(t) \end{bmatrix} = \begin{bmatrix} \frac{-R}{(Lls+M)} & -\omega v(t) & \frac{R}{(Lls+M)} & 0 & 0 \\ \omega v(t) & \frac{-R}{(Lls+M)} & 0 & \frac{R}{(Lls+M)} & 0 \\ 0 & 0 & 0 & 0 & 0 \\ 0 & 0 & 0 & 0 & 0 \\ 0 & 0 & 0 & 0 & 0 \end{bmatrix} \cdot \begin{bmatrix} \lambda qv(t) \\ \lambda dv(t) \\ \lambda f\_qv(t) \\ \lambda f\_dv(t) \\ \omega r(t) \end{bmatrix} + \begin{bmatrix} 0 \\ 0 \\ (\omega r(t)-\omega v(t)) \cdot \lambda f\_dv(t) \\ -(\omega r(t)-\omega v(t)) \cdot \lambda f\_qv(t) \\ \frac{3}{2} \cdot \frac{\frac{Np}{2}}{(J \cdot (Lls+M))} \cdot (-\lambda dv(t) \cdot \lambda f\_qv(t) + \lambda qv(t) \cdot \lambda f\_dv(t)) \end{bmatrix} + \begin{bmatrix} 1 & 0 \\ 0 & 1 \\ 0 & 0 \\ 0 & 0 \\ 0 & 0 \end{bmatrix} \cdot \begin{bmatrix} Vqv(t) \\ Vdv(t) \end{bmatrix}$$
(44)

Two modifications of the above system state equations are considered next. The first is a linearization of Equation 44:

$$\begin{bmatrix} \frac{d}{dt}\lambda qv(t) \\ \frac{d}{dt}\lambda dv(t) \\ \frac{d}{dt}\lambda f\_qv(t) \\ \frac{d}{dt}\lambda f\_dv(t) \\ \frac{d}{dt}\omega r(t) \end{bmatrix} = \begin{bmatrix} \frac{-R}{(Lls+M)} & -\omega r(t) & \frac{R}{(Lls+M)} & 0 & 0 \\ \omega v(t) & \frac{-R}{(Lls+M)} & 0 & \frac{R}{Lls+M} & 0 \\ 0 & 0 & 0 & (\omega r\_I(t)-\omega r(t)) & \lambda f\_dv\_I(t) \\ 0 & 0 & -(\omega r\_I(t)-\omega v(t)) & 0 & -\lambda f\_qv\_I(t) \\ \frac{3}{2} \cdot \frac{\frac{Np}{2}}{(J \cdot (Lls+M))} \cdot \lambda f\_dv\_I(t) & \frac{3}{2} \cdot \frac{\frac{Np}{2}}{(J \cdot (Lls+M))} \cdot (-1 \cdot \lambda f\_qv\_I(t)) & \frac{3}{2} \cdot \frac{\frac{Np}{2}}{(J \cdot (Lls+M))} \cdot (-\lambda dv\_I(t)) & \frac{3}{2} \cdot \frac{\frac{Np}{2}}{(J \cdot (Lls+M))} \cdot (\lambda qv\_I(t)) & 0 \end{bmatrix} \cdot \begin{bmatrix} \lambda qv(t) \\ \lambda dv(t) \\ \lambda f\_qv(t) \\ \lambda f\_dv(t) \\ \omega r(t) \end{bmatrix} + \begin{bmatrix} 1 & 0 \\ 0 & 1 \\ 0 & 0 \\ 0 & 0 \\ 0 & 0 \end{bmatrix} \cdot \begin{bmatrix} Vqv(t) \\ Vdv(t) \end{bmatrix}$$
(49)

The notation of "xxx_1" indicates last value of the variable. All of the states are assumed to change little with respect to the convergence rate of the estimator when the above estimator form is used. The measurement Equation 48 remains unchanged. With the assumption that all of the elements of the "A" matrix of Equation 49 are essentially constant, a "gain scheduled" observer can be designed using pole placement. The pole placement problem reduces to solving the following equation for K.

$$\text{eigenvals}(A-K \cdot C) = \text{Desired\_poles} \quad (50)$$

Where A,K,C are defined as follows:

$$A = \begin{bmatrix} \frac{-R}{(Lls+M)} & -\omega r(t) & \frac{R}{(Lls+M)} & 0 & 0 \\ \omega v(t) & \frac{-R}{(Lls+M)} & 0 & \frac{R}{(Lls+M)} & 0 \\ 0 & 0 & 0 & (\omega r\_1(t)-\omega v(t)) & \lambda f\_dvI(t) \\ 0 & 0 & -(\omega r\_1(t)-\omega v(t)) & 0 & -\lambda f\_qv\_I(t) \\ \frac{3}{2} \cdot \frac{\frac{Np}{2}}{(J \cdot (Lls+M))} \cdot & \frac{3}{2} \cdot \frac{\frac{Np}{2}}{(J \cdot (Lls+M))} \cdot & \frac{3}{2} \cdot \frac{\frac{Np}{2}}{(J \cdot (Lls+M))} \cdot & \frac{3}{2} \cdot \frac{\frac{Np}{2}}{(J \cdot (Lls+M))} \cdot & 0 \\ \lambda f\_dv\_1(t) & (-1 \cdot \lambda f\_qv\_1(t)) & (-\lambda dv\_1(t)) & (\lambda qv\_1(t)) & \end{bmatrix} \quad (51)$$

$$K = \begin{bmatrix} k11 & k12 \\ k21 & k22 \\ k31 & k32 \\ k41 & k42 \\ k51 & k52 \end{bmatrix} \quad (52)$$

$$C = \begin{bmatrix} \frac{1}{(Lls+M)} & 0 & -\left[\frac{1}{(Lls+M)}\right] & 0 & 0 \\ 0 & \frac{1}{(Lls+M)} & 0 & -\left[\frac{1}{(Lls+M)}\right] & 0 \end{bmatrix} \quad (53)$$

In a reduced order implementation where ωr(t) is not estimated directly by the estimator, the state and gain matricies become.

$$A = \begin{bmatrix} \frac{-R}{(Lls+M)} & -\omega v(t) & \frac{R}{(Lls+M)} & 0 \\ \omega v(t) & \frac{-R}{(Lls+M)} & 0 & \frac{R}{Lls+M} \\ 0 & 0 & 0 & (\omega r\_I(t)-\omega v(t)) \\ 0 & 0 & -(\omega r\_I(t)-\omega v(t)) & 0 \end{bmatrix} \quad (54)$$

$$K = \begin{bmatrix} k11 & k12 \\ k21 & k22 \\ k31 & k32 \\ k41 & k42 \end{bmatrix} \quad (55)$$

$$C = \begin{bmatrix} \frac{1}{(Lls+M)} & 0 & -\left[\frac{1}{(Lls+M)}\right] & 0 \\ 0 & \frac{1}{(Lls+M)} & 0 & -\left[\frac{1}{(Lls+M)}\right] \end{bmatrix} \quad (56)$$

The reduced order state equation can be written as $$\begin{bmatrix} \frac{d}{dt}\lambda qv(t) \\ \frac{d}{dt}\lambda dv(t) \\ \frac{d}{dt}\lambda f\_qv(t) \\ \frac{d}{dt}\lambda f\_dv(t) \end{bmatrix} = \begin{bmatrix} \frac{-R}{(Lls+M)} & -\omega v(t) & \frac{R}{(Lls+M)} & 0 \\ \omega v(t) & \frac{-R}{(Lls+M)} & 0 & \frac{R}{Lls+M} \\ 0 & 0 & 0 & (\omega r\_I(t)-\omega v(t)) \\ 0 & 0 & -(\omega r\_I(t)-\omega v(t)) & 0 \end{bmatrix} \cdot \begin{bmatrix} \lambda qv(t) \\ \lambda dv(t) \\ \lambda f\_qv(t) \\ \lambda f\_dv(t) \end{bmatrix} + \begin{bmatrix} 1 & 0 \\ 0 & 1 \\ 0 & 0 \\ 0 & 0 \end{bmatrix} \cdot \begin{bmatrix} Vqv(t) \\ Vdv(t) \end{bmatrix} \quad (57)$$

Once λf_qv(t) and λf_dv(t) are estimated, the quantities can be transformed back into the αβ0-FoR using Equation 25.

$$\begin{bmatrix} \lambda f\_\alpha\_hat(t) \\ \lambda f\_\beta\_hat(t) \end{bmatrix} = \begin{bmatrix} \cos(\theta v(t)) & \sin(\theta v(t)) \\ -\sin(\theta v(t)) & \cos(\theta v(t)) \end{bmatrix} \cdot \begin{bmatrix} \lambda f\_qv\_hat(t) \\ \lambda f\_dv\_hat(t) \end{bmatrix} \quad (58)$$

The rotor position estimate (θr_hat(t)) can be calculated using the angel (4 quadrant atan( ) function).

$$\theta r\_hat(t) = \text{angle}(f\_hat(t), \lambda f\_\beta\_ht(t)) \quad (59)$$

A means of calculating the rotor speed (ωr(t)) can be derived from Equations 9 and 10 (the phase flux linkage model and the electrical equation for the ideal PMAC motor) in the αβ0-FoR. Thus, the rotor speed is calculated not just based on differentiating the phase flux linkage, but by solving two equations for one variable in a "least squares" sense. This provides a rotor speed estimate that is more robust to parameter variations. Equations 9 and 10 are repeated below including only the αβ components.

$$\begin{bmatrix} \lambda\alpha(t) \\ \lambda\beta(t) \end{bmatrix} = \begin{bmatrix} \lambda f \cdot \cos(\theta r(t)) \\ -\lambda f \cdot \sin(\theta r(t)) \end{bmatrix} + \begin{bmatrix} Lls+M & 0 \\ 0 & Lls+M \end{bmatrix} \cdot \begin{bmatrix} I\alpha(t) \\ I\beta(t) \end{bmatrix} \quad (9)$$

$$\begin{bmatrix} V\alpha(t) \\ V\beta(t) \end{bmatrix} = \begin{bmatrix} R & 0 \\ 0 & R \end{bmatrix} \cdot \begin{bmatrix} I\alpha(t) \\ I\beta(t) \end{bmatrix} + \begin{bmatrix} \frac{d}{dt}\lambda\alpha(t) \\ \frac{d}{dt}\lambda\beta(t) \end{bmatrix} \quad (10)$$

Differentiating Equation 9 with respect to time results in $$\begin{bmatrix} \frac{d}{dt}\lambda\alpha(t) \\ \frac{d}{dt}\lambda\beta(t) \end{bmatrix} = \begin{bmatrix} -\lambda f \cdot \sin(\theta r(t)) \cdot \omega r(t) \\ -\lambda f \cdot \cos(\theta r(t)) \cdot \omega r(t) \end{bmatrix} + \begin{bmatrix} Lls+M & 0 \\ 0 & Lls+M \end{bmatrix} \cdot \begin{bmatrix} \frac{d}{dt}I\alpha(t) \\ \frac{d}{dt}I\beta(t) \end{bmatrix} \quad (60)$$

Equation 60 can now be substituted into Equation 10 to form a complete voltage equation $$\begin{bmatrix} V\alpha(t) \\ V\beta(t) \end{bmatrix} = \begin{bmatrix} R & 0 \\ 0 & R \end{bmatrix} \cdot \begin{bmatrix} I\alpha(t) \\ I\beta(t) \end{bmatrix} + \begin{bmatrix} -\lambda f \cdot \sin(\theta r(t)) \cdot \omega r(t) \\ -\lambda f \cdot \cos(\theta r(t)) \cdot \omega r(t) \end{bmatrix} + \begin{bmatrix} Lls+M & 0 \\ 0 & Lls+M \end{bmatrix} \cdot \begin{bmatrix} \frac{d}{dt}I\alpha(t) \\ \frac{d}{dt}I\beta(t) \end{bmatrix} \quad (61)$$

Equation 61 is transformed into the QDr-FoR (rotating in synchronism with the rotor) using the rotor position estimate. First the a variables are substituted for using the relationship described in Equation 28.

$$\begin{bmatrix} \cos(\theta r(t)) & \sin(\theta r(t)) \\ -\sin(\theta r(t)) & \cos(\theta r(t)) \end{bmatrix} \cdot \begin{bmatrix} Vqr(t) \\ Vdr(t) \end{bmatrix} = \begin{bmatrix} R & 0 \\ 0 & R \end{bmatrix} \cdot \begin{bmatrix} \cos(\theta r(t)) & \sin(\theta r(t)) \\ -\sin(\theta r(t)) & \cos(\theta r(t)) \end{bmatrix} \cdot \begin{bmatrix} Iqr(t) \\ Idr(t) \end{bmatrix} + \begin{bmatrix} -\lambda f \cdot \sin(\theta r(t)) \cdot \omega r(t) \\ -\lambda f \cdot \cos(\theta r(t)) \cdot \omega r(t) \end{bmatrix} + \begin{bmatrix} Lls+M & 0 \\ 0 & Lls+M \end{bmatrix} \frac{d}{dt} \left[ \begin{bmatrix} \cos(\theta v(t)) & \sin(\theta v(t)) \\ -\sin(\theta v(t)) & \cos(\theta v(t)) \end{bmatrix} \cdot \begin{bmatrix} Iqr(t) \\ Idr(t) \end{bmatrix} \right] \quad (62)$$

The last term on the right side of Equation 62 can be expanded as follows:

$$\begin{bmatrix} \cos(\theta r(t)) & \sin(\theta r(t)) \\ -\sin(\theta r(t)) & \cos(\theta r(t)) \end{bmatrix} \cdot \begin{bmatrix} Vqr(t) \\ Vdr(t) \end{bmatrix} = \begin{bmatrix} R & 0 \\ 0 & R \end{bmatrix} \cdot \begin{bmatrix} \cos(\theta r(t)) & \sin(\theta r(t)) \\ -\sin(\theta r(t)) & \cos(\theta r(t)) \end{bmatrix} \cdot \begin{bmatrix} Iqr(t) \\ Idr(t) \end{bmatrix} + \begin{bmatrix} -\lambda f \cdot \sin(\theta r(t)) \cdot \omega r(t) \\ -\lambda f \cdot \cos(\theta r(t)) \cdot \omega r(t) \end{bmatrix} + \begin{bmatrix} Lls+M & 0 \\ 0 & Lls+M \end{bmatrix} \cdot \left[ \begin{bmatrix} -\sin(\theta r(t)) & \cos(\theta r(t)) \\ -\sin(\theta r(t)) & -\sin(\theta r(t)) \end{bmatrix} \cdot \begin{bmatrix} Iqr(t) \\ Idr(t) \end{bmatrix} \cdot \omega r(t) + \begin{bmatrix} \cos(\theta r(t)) & \sin(\theta r(t)) \\ -\sin(\theta r(t)) & \cos(\theta r(t)) \end{bmatrix} \cdot \begin{bmatrix} \frac{d}{dt}Iqr(t) \\ \frac{d}{dt}Idr(t) \end{bmatrix} \right] \quad (63)$$

Multiplying both sides of Equation 63 by KQDr_αβ results in $$\begin{bmatrix} Vqr(t) \\ Vdr(t) \end{bmatrix} = \begin{bmatrix} R & 0 \\ 0 & R \end{bmatrix} \cdot \begin{bmatrix} Iqr(t) \\ Idr(t) \end{bmatrix} + \begin{bmatrix} 0 \\ -\lambda f \cdot \omega r(t) \end{bmatrix} + \begin{bmatrix} 0 & Lls+M \\ -Lls-M & 0 \end{bmatrix} \cdot \begin{bmatrix} Iqr(t) \\ Idr(t) \end{bmatrix} \cdot \omega r(t) + \begin{bmatrix} Lls+M & 0 \\ 0 & Lls+M \end{bmatrix} \cdot \begin{bmatrix} \frac{d}{dt}Iqr(t) \\ \frac{d}{dt}Idr(t) \end{bmatrix} \quad (64)$$

Equation 64 can be viewed as having one unknown. Writing Equation 64 with ωr(t) as the independent variable:

$$\begin{bmatrix} (Lls+M) \cdot Id0 - r(t) \\ (-Lls-M) \cdot Iqr(t) - \lambda f \end{bmatrix} \cdot \omega r(t) = \begin{bmatrix} Vqr(t) \\ Vdr(t) \end{bmatrix} - \begin{bmatrix} R \cdot Iqr(t) \\ R \cdot Idr(t) \end{bmatrix} - \begin{bmatrix} (Lls+M) \cdot \frac{d}{dt}Iqr(t) \\ (Lls+M) \cdot \frac{d}{dt}Idr(t) \end{bmatrix} \quad (65)$$

Equation 69 can be solved in a "least squares" sense for ωr(t) as follows:

$$\omega r(t) = pinv\left(\begin{bmatrix} (Lls+M) \cdot Idr(t) \\ (-Lls-M) \cdot Iqr(t) - \lambda f \end{bmatrix}\right) \cdot \left[ \begin{bmatrix} Vqr(t) \\ Vdr(t) \end{bmatrix} - \begin{bmatrix} R \cdot Iqr(t) \\ R \cdot Idr(t) \end{bmatrix} - \begin{bmatrix} (Lls+M) \cdot \frac{d}{dt}Iqr(t) \\ (Lls+M) \cdot \frac{d}{dt}Idr(t) \end{bmatrix} \right] \quad (66)$$

Where pinv(X) is defined as $$pinv(X) := (X^T \cdot X)^{-1} \cdot X^T \quad (67)$$

Hence, solving for ωr(t) results in $$\omega r(t) = \left[ \begin{bmatrix} (Lls+M) \cdot Idr(t) \\ (-Lls-M) \cdot Iqr(t) - \lambda f \end{bmatrix}^T \cdot \begin{bmatrix} (Lls+M) \cdot Idr(t) \\ (-Lls-M) \cdot Iqr(t) - \lambda f \end{bmatrix} \right]^{-1} \cdot \begin{bmatrix} (Lls+M) \cdot Idr(t) \\ (-Lls-M) \cdot Iqr(t) - \lambda f \end{bmatrix}^T \cdot \left[ \begin{bmatrix} Vqr(t) \\ Vdr(t) \end{bmatrix} - \begin{bmatrix} R \cdot Iqr(t) \\ R \cdot Idr(t) \end{bmatrix} - \begin{bmatrix} (Lls+M) \cdot \frac{d}{dt}Iqr(t) \\ (Lls+M) \cdot \frac{d}{dt}Idr(t) \end{bmatrix} \right] \quad (68)$$

The pinv(X) function in terms of a general 2X1 A matrix results in $$pinv\left(\begin{bmatrix} x1 \\ x2 \end{bmatrix}\right) \rightarrow \begin{bmatrix} \frac{x1}{x1^2+x2^2} & \frac{x2}{x1^2+x2^2} \end{bmatrix} \quad (69)$$

Flux linkage control laws for the system in the QdrFoR can be derived from equation 57 by substituting ωr(t) for ω(t) therein.

$$\begin{bmatrix} \frac{d}{dt}\lambda qr(t) \\ \frac{d}{dt}\lambda dr(t) \\ \frac{d}{dt}\lambda f\_qr(t) \\ \frac{d}{dt}\lambda f\_dr(t) \end{bmatrix} = \begin{bmatrix} \frac{-R}{(Lls+M)} & -\omega r(t) & \frac{R}{(Lls+M)} & 0 \\ \omega r(t) & \frac{-R}{(Lls+M)} & 0 & \frac{R}{Lls+M} \\ 0 & 0 & 0 & 0 \\ 0 & 0 & 0 & 0 \end{bmatrix} \cdot \begin{bmatrix} \lambda qr(t) \\ \lambda dr(t) \\ \lambda f\_qr(t) \\ \lambda f\_dr(t) \end{bmatrix} + \begin{bmatrix} 1 & 0 \\ 0 & 1 \\ 0 & 0 \\ 0 & 0 \end{bmatrix} \cdot \begin{bmatrix} Vqr(t) \\ Vdr(t) \end{bmatrix} \quad (70)$$

The state variables λf_qr(t), λf_dr(t) (the magnet induced portion of flux linkage) and their derivatives are uncontrollable. Equation 70 can be reduced to only the two controllable states λqr(t), λdr(t) and their derivatives, with λf_qr(t), λf_dr(t) viewed as external fixed inputs.

$$\begin{bmatrix} \frac{d}{dt}\lambda qr(t) \\ \frac{d}{dt}\lambda dr(t) \end{bmatrix} = \begin{bmatrix} \frac{-R}{(Lls+M)} & -\omega r(t) \\ \omega r(t) & \frac{-R}{(Lls+M)} \end{bmatrix} \cdot \begin{bmatrix} \lambda qr(t) \\ \lambda dr(t) \end{bmatrix} + \begin{bmatrix} 1 & 0 \\ 0 & 1 \end{bmatrix} \cdot \begin{bmatrix} Vqr(t) \\ Vdr(t) \end{bmatrix} + \begin{bmatrix} \frac{R}{(Lls+M)} \cdot \lambda f\_qr(t) \\ \frac{R}{(Lls+M)} \cdot \lambda f\_dr(t) \end{bmatrix} \quad (71)$$

The control inputs are Vqr and Vdr. The dependence of λqr(t) and λdr(t) on ωr(t) can be eliminated if Vqr(t) and Vdr(t) both contain a canceling term, such as the following:

$$V_{qr\_tot} = Vqr\_cancelling + Vqr\_tracking \quad (72)$$

$$V_{dr\_tot} = Vdr\_cancelling + Vdr\_tracking \quad (73)$$

Substituting for the canceling and tracking terms results in $$Vqr\_tot = \omega r(t) \cdot \lambda dr(t) + Vqr\_track \quad (74)$$

$$Vdr\_tot = (-1) \cdot \omega r(t) \cdot \lambda qr(t) + Vdr\_track \quad (75)$$

The choice of λqr_ref and λdr_ref is typically dependent upon the torque required from the machine. In the QDr-FoR for the particular motor model of this particular implementation, λf_qr=λf and λf_dr=0. The torque equation in terms of λqr, λdr, λf_qr, λf_dr in the QDr-FoR can be written as $$Te = \left[\frac{3}{2 \cdot (Lls+M)}\right] \cdot \frac{Np}{2} \cdot (\lambda qr(t) \cdot \lambda f\_dr(t) - \lambda dr(t) \cdot \lambda f\_qr(t)) \quad (76)$$

The λf_qr and λf_dr, the terms that describe the magnet induced flux linkage in the QDr-FoR are given as.

$$\begin{bmatrix} \lambda f\_qr(t) \\ \lambda f\_dr(t) \end{bmatrix} = \begin{bmatrix} \lambda f \\ 0 \end{bmatrix} \quad (77)$$

Since λf_dr=0, λqr can take any value without affecting the torque produced by the motor for the particular case of the motor model of this particular implementation. With that in mind, λqr_ref can be made equal to λf in the case where maximum torque per unit amp is desired (Iqr=0).

Equation 77 can be substituted into equation 76.

$$Te = \left[\frac{-3}{2 \cdot (Lls+M)}\right] \cdot \frac{Np}{2} \cdot (\lambda dr(t) \cdot \lambda f) \quad$$

If the mechanical system is considered to be inertial only, Te=Tm=J*ω_dot, a state equation can be written in terms of the state vector $$\begin{bmatrix} \lambda qr(t) \\ \lambda dr(t) \\ \omega r\_m \end{bmatrix}$$

where ωr_m is the mechanical angular velocity of the rotor.

$$\begin{bmatrix} \frac{d}{dt}\lambda qr(t) \\ \frac{d}{dt}\lambda dr(t) \\ \frac{d}{dt}\omega r\_m(t) \end{bmatrix} = \begin{bmatrix} \frac{-R}{(Lls+M)} & -\omega r(t) & 0 \\ \omega r(t) & \frac{-R}{(Lls+M)} & 0 \\ 0 & \left[\frac{-3}{2 \cdot (Lls+M) \cdot 3}\right] \cdot \frac{Np}{2} \cdot (\lambda f) & 0 \end{bmatrix} \cdot \begin{bmatrix} \lambda qr(t) \\ \lambda dr(t) \\ \omega r\_m(t) \end{bmatrix} + \begin{bmatrix} 1 & 0 \\ 0 & 1 \\ 0 & 0 \end{bmatrix} \cdot \begin{bmatrix} Vqr(t) \\ Vdr(t) \end{bmatrix} + \begin{bmatrix} \frac{R}{(Lls+M)} \cdot \lambda f \\ 0 \\ 0 \end{bmatrix} \quad (79)$$

Vqr(t) and Vdr(t) can be substituted for using Equations 74 and 75:

$$\begin{bmatrix} \frac{d}{dt}\lambda qr(t) \\ \frac{d}{dt}\lambda dr(t) \\ \frac{d}{dt}\omega r\_m(t) \end{bmatrix} = \begin{bmatrix} \frac{-R}{(Lls+M)} & -\omega r(t) & 0 \\ \omega r(t) & \frac{-R}{(Lls+M)} & 0 \\ 0 & \left[\frac{-3}{2 \cdot (Lls+M) \cdot J}\right] \cdot \frac{Np}{2} \cdot (\lambda f) & 0 \end{bmatrix} \cdot \begin{bmatrix} \lambda qr(t) \\ \lambda dr(t) \\ \omega r\_m(t) \end{bmatrix} + \begin{bmatrix} 1 & 0 \\ 0 & 1 \\ 0 & 0 \end{bmatrix} \cdot \begin{bmatrix} \omega r(t) \cdot \lambda dr(t) + Vqr\_track \\ (-1) \cdot \omega r(t) \cdot \lambda qr(t) + Vdr\_track \end{bmatrix} + \begin{bmatrix} \frac{R}{(Lls+M)} \cdot \lambda f\_qr(t) \\ \frac{R}{(Lls+M)} \cdot \lambda f\_dr(t) \\ 0 \end{bmatrix} \quad (80)$$

Simplifying Equation 80 results in $$\begin{bmatrix} \frac{d}{dt}\lambda qr(t) \\ \frac{d}{dt}\lambda dr(t) \\ \frac{d}{dt}\omega r\_m(t) \end{bmatrix} = \begin{bmatrix} \frac{-R1}{Lls+M} & 0 & 0 \\ 0 & \frac{-R}{Lls+M} & 0 \\ 0 & \left[\frac{-3}{2 \cdot (Lls+M) \cdot J}\right] \cdot \frac{Np}{2} \cdot (\lambda f) & 0 \end{bmatrix} \cdot \begin{bmatrix} \lambda qr(t) \\ \lambda dr(t) \\ \omega r\_m(t) \end{bmatrix} + \begin{bmatrix} 1 & 0 \\ 0 & 1 \\ 0 & 0 \end{bmatrix} \cdot \begin{bmatrix} Vqr\_track \\ Vdr\_track \end{bmatrix} + \quad (81)$$

-continued $$\begin{bmatrix} \frac{R}{(Lls+M)} \cdot \lambda f \\ 0 \\ 0 \end{bmatrix}$$

Equation 81 describes a linear system with 3 states. In certain implementations, the system described above contains proportional-integal ("PI") regulation for λqr, λdr feedback and PI regulation of ωr_m. The tracking inputs, Vqr_track and Vdr_track can be written as PI feedback control laws.

$$\begin{bmatrix} V\text{qr\_track}(t) \\ V\text{dr\_track}(t) \end{bmatrix} = \begin{bmatrix} K\lambda\text{qr\_P} \cdot (\lambda\text{qr\_ref}(t) - \lambda qr(t)) + \\ \int K\lambda\text{qr\_I} \cdot (\lambda\text{qr\_ref}(t) - \lambda qr(t))dt \\ K\lambda\text{dr\_P} \cdot [K\omega\text{r\_m\_P} \cdot (\omega\text{r\_m\_ref}(t) - \omega\text{r\_m}(t)) + \\ \int K\omega\text{r\_m\_I} \cdot (\omega\text{r\_m\_ref}(t) - \omega\text{r\_m}(t))dt - \lambda dr(t)] \end{bmatrix} \quad (82)$$

To solve for the P and I gains, two new states can be defined that represent the integral with respect to time of λqr(t) and ωr_m(t).

$$\begin{bmatrix} \theta\text{r\_m}(t) \\ \lambda\text{qr\_int}(t) \end{bmatrix} = \begin{bmatrix} \int \omega\text{r\_m}(t)dt \\ \int \lambda qr(t)dt \end{bmatrix} \quad (83)$$

Equation 82 can be rewritten using Equation 83 as follows:

$$\begin{bmatrix} V\text{qr\_track}(t) \\ V\text{dr\_track}(t) \end{bmatrix} = \begin{bmatrix} K\lambda\text{qr\_P} \cdot (\lambda\text{qr\_ref}(t) - \lambda qr(t)) + \\ K\lambda\text{qr\_I} \cdot (\lambda\text{qr\_int\_ref}(t) - \lambda\text{qr\_int}(t)) \\ K\lambda\text{dr\_P} \cdot (K\omega\text{r\_m\_P} \cdot (\omega\text{r\_m\_ref}(t) - \omega\text{r\_m}(t)) + \\ K\omega\text{r\_m\_I} \cdot (\theta\text{r\_m\_ref}(t) - \theta\text{r\_m}(t)) - \lambda dr(t)) \end{bmatrix} \quad (84)$$

Writing a new state equation by augmenting Equation 81 with Equation 84 results in $$\begin{bmatrix} \frac{d}{dt}\lambda\text{qr\_int}(t) \\ \frac{d}{dt}\lambda qr(t) \\ \frac{d}{dt}\lambda dr(t) \\ \frac{d}{dt}\theta\text{r\_m}(t) \\ \frac{d}{dt}\omega\text{r\_n}(t) \end{bmatrix} = \begin{bmatrix} 0 & 1 & 0 & 0 & 0 \\ -K\lambda\text{qr\_I} & \frac{-R}{Lls+M} - K\lambda\text{qr\_P} & 0 & 0 & 0 \\ 0 & 0 & \frac{-R}{Lls+M} - K\lambda\text{qr\_P} & -K\lambda\text{dr\_P} \cdot K\omega\text{r\_m\_I} & -K\lambda\text{dr\_P} \cdot K\omega\text{r\_m\_P} \\ 0 & 0 & 0 & 0 & 1 \\ 0 & 0 & \left[\frac{-3}{2 \cdot (Lls+M) \cdot J}\right] \cdot \frac{Np}{2} \cdot (\lambda f) & 0 & 0 \end{bmatrix} \cdot \begin{bmatrix} \lambda\text{qr\_int}(t) \\ \lambda qr(t) \\ \lambda dr(t) \\ \theta\text{r\_m}(t) \\ \omega\text{r\_m}(t) \end{bmatrix} + \begin{bmatrix} 0 & 0 & 0 & 0 \\ K\lambda\text{qr\_I} & K\lambda\text{qr\_P} & 0 & 0 \\ 0 & 0 & K\lambda\text{dr\_P} \cdot K\omega\text{r\_m\_I} & K\lambda\text{dr\_P} \cdot K\omega\text{r\_m\_P} \\ 0 & 0 & 0 & 0 \\ 0 & 0 & 0 & 0 \end{bmatrix} \cdot \begin{bmatrix} \lambda\text{qr\_int\_ref}(t) \\ \lambda\text{qr\_ref}(t) \\ \theta\text{r\_m\_ref}(t) \\ \omega\text{r\_m\_ref}(t) \end{bmatrix} + \begin{bmatrix} 0 \\ \frac{R}{(Lls+M)} \cdot \lambda f \\ 0 \\ 0 \\ 0 \end{bmatrix} \quad (85)$$

The inputs λqr_int_ref(t) and θr_m_ref(t) are fictitious and result from the Integral portion of (ωr_m_ref-ωr_m) and (λqr_ref-λqr). Equation 85 can be partitioned into two independent equations:

$$\begin{bmatrix} \frac{d}{dt}\lambda qr\_int(t) \\ \frac{d}{dt}\lambda qr(t) \end{bmatrix} = \begin{bmatrix} 0 & 1 \\ -K\lambda qr\_I & \frac{-R1}{Lls+M} - K\lambda qr\_P \end{bmatrix} \cdot \qquad (86)$$

$$\begin{bmatrix} \lambda qr\_int(t) \\ \lambda qr(t) \end{bmatrix} + \begin{bmatrix} 0 & 0 \\ K\lambda qr\_I & K\lambda qr\_P \end{bmatrix} \cdot$$

$$\begin{bmatrix} \lambda qr\_int\_ref(t) \\ \lambda qr\_ref(t) \end{bmatrix} + \begin{bmatrix} 0 \\ \frac{R}{(Lls+M)} \cdot \lambda f \end{bmatrix}$$

$$\begin{bmatrix} \frac{d}{dt}\lambda dr(t) \\ \frac{d}{dt}\theta r\_m(t) \\ \frac{d}{dt}\omega r\_m(t) \end{bmatrix} = \begin{bmatrix} \frac{-R}{Lls+M} - K\lambda dr\_P & -K\lambda dr\_P \cdot K\omega r\_m\_I & -K\lambda dr\_P \cdot K\omega r\_m\_P \\ 0 & 0 & 1 \\ \left[\frac{-3}{2 \cdot (Lls+M) \cdot I}\right] \cdot \frac{Np}{2} \cdot (\lambda f) & 0 & 0 \end{bmatrix} \cdot$$

$$\begin{bmatrix} \lambda dr(t) \\ \theta r\_m(t) \\ \omega r\_m(t) \end{bmatrix} + \begin{bmatrix} K\lambda dr\_P \cdot K\omega r\_m\_I & K\lambda dr\_P \cdot K\omega r\_m\_P \\ 0 & 0 \\ 0 & 0 \end{bmatrix} \cdot \begin{bmatrix} \theta r\_m\_ref(t) \\ \omega r\_m\_ref(t) \end{bmatrix}$$

The design of the controller thus reduces to placing the poles of Equations 86 and 87 by choosing $K\lambda qr\_P$, $K\lambda qr\_I$, $K\lambda dr\_P$, $K\omega r\_m\_P$, $K\omega r\_m\_I$.

The particular embodiments disclosed above are illustrative only, as the invention may be modified and practiced in different but equivalent manners apparent to those skilled in the art having the benefit of the teachings herein. For example, harmonics may be included in the various transformations described herein, allowing square wave excitation of the phase windings. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of controlling a permanent magnet rotating machine, the machine including a stator and a rotor situated to rotate relative to the stator, the stator having a plurality of energizable phase windings situated therein, the method comprising:
   receiving a rotor speed demand;
   generating a rotor speed command in response to the speed demand;
   generating a first rotating reference frame rotating at the commanded rotor speed;
   receiving phase winding energization feed back;
   transforming the phase winding energization feed back from a stationary reference frame to the first rotating reference frame;
   estimating the actual rotor position;
   generating a second rotating reference frame rotating with the estimated actual rotor position;
   transforming the energization feed back from the first rotating reference frame to the second rotating reference frame;
   estimating the actual rotor speed;
   calculating phase energization commands; and
   transforming the phase energization commands from the second rotating reference frame to the stationary reference frame.

2. The method of claim 1, further comprising calculating a rotor position command based on the rotor speed command, and wherein the first rotating reference frame is generated based on the rotor position command.

3. The method of claim 1, wherein receiving phase winding energization feed back includes measuring the phase currents.

4. The method of claim 1, further comprising energizing the phase windings in response to the phase energization commands.

5. The method of claim 4, wherein energizing the phase windings includes applying sine wave excitation currents to the phase windings.

6. The method of claim 1, further comprising energizing the phase windings with a three phase balanced feed, wherein transforming the phase winding feed back from the stationary reference frame to the first rotating reference frame includes transforming the energization feed back from the ABC reference frame to the αβ0 reference frame.

7. The method of claim 1, further comprising estimating the total phase flux linkage and the magnet induced flux linkage based on the energization feed back.

8. The method of claim 7, further comprising estimating the actual rotor position based on the estimated magnet induced flux linkage.

9. The method of claim 8, further comprising energizing the phase windings with a three phase balanced feed, wherein estimating the actual rotor position includes transforming the estimated magnet induced flux linkage from the first rotating reference frame to the αβ0 reference frame.

10. The method of claim 1, wherein estimating the actual rotor speed includes solving two equations for one unknown.

11. A control system for a permanent magnet rotating machine including a rotor and a stator, the control system comprising:
    an estimator operable to calculate an estimate of the rotor speed, the estimator having input terminals for receiving energization feed back from the permanent magnet rotating machine in a first rotating reference frame and output terminals for providing the rotor speed estimate in a second rotating reference frame; and
    a controller having input terminals for receiving a rotor speed demand and the rotor speed estimate, the controller having output terminals for providing control signals for controlling energization of the permanent magnet rotating machine in response to the rotor speed demand and rotor speed estimate signals.

12. The control system of claim 11, further comprising a function block operable to transform the energization feed back from a stationary reference frame to the first rotating reference frame.

13. The control system of claim 12, wherein the controller includes an angle controller operable to calculate a rotor position command in response to the rotor speed demand, and wherein the function block is connected to the controller to receive the rotor position command and generate the first rotating reference frame in response to the rotor position command such that the first rotating reference frame rotates in synchronism with the demanded rotor speed.

14. The control system of claim 13, wherein the estimator includes an angle estimator operable to calculate an estimate of the rotor position, wherein the second rotating reference frame is generated in response to the estimated rotor position such that the second reference frame rotates in synchronism with the estimated rotor speed and position.

15. The control system of claim 14, wherein the estimator includes a flux linkage estimator operable to calculate an estimate of the permanent magnet rotating machine total phase flux linkage and the magnet induced flux linkage based on the received energization feed back, wherein the angle estimator receives the estimate of the magnet induced flux linkage, and wherein the estimate of the rotor position is calculated based on the estimate of the magnet induced flux linkage.

16. The control system of claim 11, wherein the controller includes a start controller operable to generate open loop control signals for controlling energization of the permanent magnet rotating machine in response to the rotor speed demand.

17. The control system of claim 13, wherein angle controller is further operable to calculate a rotor speed command in response to the rotor speed demand, and wherein the controller includes a start controller coupled to the angle controller operable to generate open loop control signals for controlling energization of the permanent magnet rotating machine in response to the rotor speed command.

18. A permanent magnet rotating machine system, comprising:
a stator having a plurality of energizable phase windings therein;
a rotor situated to rotate relative to the stator;
a driver connected to the phase windings for providing electric power thereto;
an estimator coupled to the phase windings to receive energization feed back in a first rotating reference frame, the estimator calculating an estimate of the rotor speed in a second rotating reference frame based on the energization feed back; and
a controller having an input terminal for receiving a rotor speed demand, the controller connected to the estimator to receive the rotor speed estimate, the controller providing control signals to the driver for controlling the application of the electric power to the phase windings in response to the rotor speed demand and rotor speed estimate signals.

19. The permanent magnet rotating machine system of claim 18, wherein the driver provides sine wave excitation currents to the phase windings.

20. The permanent magnet rotating machine system of claim 18, wherein the driver provides excitation currents using a three phase balanced feed.

21. The permanent magnet rotating machine system of claim 18, further comprising a function block operable to transform the energization feed back from a stationary reference frame to the first rotating reference frame.

22. The permanent magnet rotating machine system of claim 21, wherein the controller includes an angle controller operable to calculate a rotor position command in response to the rotor speed demand, and wherein the function block is connected to the controller to receive the rotor position command and generate the first rotating reference frame in response to the rotor position command such that the first rotating reference frame rotates in synchronism with the demanded rotor speed and position.

23. The permanent magnet rotating machine system of claim 22, wherein the estimator includes an angle estimator operable to calculate an estimate of the rotor position, wherein the second rotating reference frame is generated in response to the estimated rotor position such that the second reference frame rotates in synchronism with the estimated rotor speed.

24. The permanent magnet rotating machine system of claim 23, wherein the estimator includes a flux linkage estimator operable to calculate an estimate of the permanent magnet rotating machine total phase flux linkage and the magnet induced flux linkage based on the energization feed back, wherein the angle estimator receives the estimate of the magnet induced flux linkage and the estimate of the rotor position is calculated based on the estimate of the magnet induced flux linkage.

25. The permanent magnet rotating machine system of claim 18, wherein the controller includes a start controller operable to generate open loop control signals for controlling the application of the electric power to the phase windings in response to the rotor speed demand.

* * * * *